(12) United States Patent
Tominaga et al.

(10) Patent No.: US 8,807,259 B2
(45) Date of Patent: Aug. 19, 2014

(54) MOTORCYCLE

(71) Applicants: Yamaha Hatsudoki Kabushiki Kaisha, Iwata (JP); Kayaba Industry Co., Ltd., Tokyo (JP)

(72) Inventors: Shuji Tominaga, Shizuoka (JP); Yuki Amano, Tokyo (JP)

(73) Assignees: Yamaha Hatsudoki Kabushiki Kaisha, Shizuoka (JP); Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 14/037,525

(22) Filed: Sep. 26, 2013

(65) Prior Publication Data

US 2014/0091552 A1 Apr. 3, 2014

(30) Foreign Application Priority Data

Sep. 28, 2012 (JP) .................................. 2012-218336

(51) Int. Cl.
| | |
|---|---|
| *B60K 11/00* | (2006.01) |
| *B62K 25/28* | (2006.01) |
| *B62K 25/04* | (2006.01) |
| *B62K 11/00* | (2006.01) |
| *B62K 11/04* | (2006.01) |
| *B60G 17/016* | (2006.01) |
| *B60T 8/36* | (2006.01) |

(52) U.S. Cl.
CPC .............. *B62K 25/04* (2013.01); *B62K 25/283* (2013.01); *B60G 2300/12* (2013.01); *B62K 25/286* (2013.01); *B62K 2025/045* (2013.01); *B62K 11/00* (2013.01); *B62K 2025/048* (2013.01); *B62K 11/04* (2013.01); *B60G 2500/30* (2013.01); *B60G 17/016* (2013.01); *B60T 8/3685* (2013.01)

USPC .......................................................... 180/219

(58) Field of Classification Search
USPC .................................. 180/219; 280/5.5, 5.514
See application file for complete search history.

(56) References Cited

U.S. PATENT DOCUMENTS

| | | | |
|---|---|---|---|
| 4,568,101 A * | 2/1986 | Bleustein et al. ............. | 180/227 |
| 5,211,420 A | 5/1993 | Iwashita | |
| 8,672,334 B1 * | 3/2014 | Murakami et al. ......... | 280/5.514 |

FOREIGN PATENT DOCUMENTS

| | | | |
|---|---|---|---|
| JP | 02-014992 | A | 1/1990 |
| JP | 05-003679 | U | 1/1993 |
| JP | 06-143969 | A | 5/1994 |
| JP | 2009-101863 | A | 5/2009 |
| JP | 2011-011683 | A | 1/2011 |

OTHER PUBLICATIONS

Official Communication issued in corresponding European Patent Application No. 13186455.5, mailed on Nov. 14, 2013.

* cited by examiner

*Primary Examiner* — Kevin Hurley
(74) *Attorney, Agent, or Firm* — Keating & Bennett, LLP

(57) ABSTRACT

A motorcycle includes a seat supported on a pair of seat frames of a vehicle body frame. A rear wheel is disposed under the pair of seat frames in a side view of the motorcycle, and is swingable in an up-down direction. A damper includes a hydraulic jack to adjust the vehicle height. The pump unit includes a hydraulic pump to feed oil to the hydraulic jack and a vehicle height adjusting motor to drive the hydraulic pump. The vehicle height adjusting motor is located under the seat, and disposed between the pair of seat frames in a plan view of the motorcycle.

12 Claims, 12 Drawing Sheets

MOTORCYCLE

BACKGROUND OF THE INVENTION

1. Field of the Invention

The present invention relates to a motorcycle.

2. Description of the Related Art

The vehicle height of a motorcycle (height of a seating surface of the seat) is adjusted by changing the axial length of the rear suspension. Japanese Unexamined Patent Publication No. 2011-11683 discloses an electrically-operated vehicle height adjusting pump that adjusts the vehicle height of a motorcycle. The vehicle height adjusting pump includes a cylinder, a piston disposed in the cylinder, a motor to drive the piston, and a plate to hold the motor. The plate is fixed to a vehicle body (seat frame) of the motorcycle via a rubber vibration isolator. The motor is disposed laterally of the seat frame.

A conventional electrically-operated vehicle height adjusting device includes a vehicle height adjusting motor and a hydraulic pump. However, a motorcycle has virtually no extra space to dispose components such as a vehicle height adjusting motor and a hydraulic pump inside the vehicle. Particularly, in a touring type motorcycle, because the engine is large and the seat is low in height, disposing these components is more difficult than in other types of motorcycles.

For the vehicle height adjusting pump of Japanese Unexamined Patent Publication No. 2011-11683, the vehicle height adjusting motor is disposed laterally of the seat frame, not inside the vehicle. However, in this structure, the vehicle height adjusting motor may obstruct a leg of the driver while riding or stopping. Further, because the vehicle height adjusting motor is exposed and uncovered, the motor may not be sufficiently protected against water and dust.

SUMMARY OF THE INVENTION

In order to overcome the previously unrecognized and unsolved challenges described above, a preferred embodiment of the present invention provides a motorcycle including a vehicle body frame, a seat, a rear wheel, a damper, and a pump unit. The vehicle body frame includes a pair of seat frames spaced apart and opposing each other in a left-right direction of the motorcycle. The seat is supported on the pair of seat frames. The rear wheel is disposed under the pair of seat frames as seen in a side view (side view of the vehicle), and is swingable in the up-down direction with respect to the vehicle body frame. The damper absorbs shocks between the vehicle body frame and the rear wheel. The damper includes a hydraulic jack to adjust the vehicle height. The pump unit includes a hydraulic pump to feed oil to the hydraulic jack and a vehicle height adjusting motor to drive the hydraulic pump. The vehicle height adjusting motor is located under the seat, and is disposed between the pair of seat frames as seen in a plan view (plan view of the vehicle).

According to this arrangement of the present preferred embodiment of the present invention, the hydraulic pump provided in the pump unit is driven by the vehicle height adjusting motor. Oil fed by the hydraulic pump is supplied to the hydraulic jack provided in the damper. The vehicle height of the motorcycle is thus adjusted. The vehicle height adjusting motor is disposed under the seat supported by the pair of seat frames. Further, the vehicle height adjusting motor is disposed between the pair of seat frames in a plan view of the motorcycle. That is, the seat is disposed over the vehicle height adjusting motor, and the seat frames are disposed on the right side and left side of the vehicle height adjusting motor. The vehicle height adjusting motor is thus protected by the seat and the seat frames. Further, because the vehicle height adjusting motor is disposed between the pair of seat frames in a plan view, an increase in the size of the motorcycle in the vehicle width direction (left-right direction) is significantly reduced or prevented.

In a preferred embodiment of the present invention, the hydraulic pump may extend in a direction inclined with respect to the front-rear direction in a plan view.

According to this arrangement of the present preferred embodiment of the present invention, the length of the hydraulic pump in the front-rear direction is reduced more than when the hydraulic pump extends along a straight line parallel or substantially parallel to the front-rear direction and the hydraulic pump is not inclined with respect to the front-rear direction. Thus, an increase in the size of the motorcycle is significantly reduced or prevented.

In a preferred embodiment of the present invention, at least a portion of the pump unit may overlap a swing region of the rear wheel in a side view.

The rear wheel is swingable in the up-down direction within the swing region with respect to the vehicle body frame. According to this arrangement of the present preferred embodiment of the present invention, the entirety or a portion of the pump unit is disposed at the same height as that of a portion of the swing region, and at least a portion of the pump unit and a portion of the swing region are aligned in the left-right direction. That is, the height of the pump unit is reduced so that at least a portion of the pump unit overlaps the swing region in a side view of the motorcycle. An increase in the vehicle height is thus significantly reduced or prevented. Thus, an increase in the size of the motorcycle is significantly reduced or prevented. Further, because the height of the center of gravity is lowered, the motorcycle has enhanced stability.

In a preferred embodiment of the present invention, the pump unit as a whole may be disposed between a right end edge and a left end edge of the vehicle body frame in a plan view.

According to this arrangement of the present preferred embodiment of the present invention, the pump unit as a whole is disposed between the right end edge and the left end edge of the vehicle body frame in a plan view. The width of the motorcycle is thus significantly reduced. As a result, an increase in the size of the motorcycle is significantly reduced or prevented. Further, because the pump unit is less likely to obstruct a leg of the driver while riding or stopping than when the pump unit is disposed laterally of the seat frame, the comfort of the driver is enhanced.

In a preferred embodiment of the present invention, at least a portion of the pump unit may overlap the pair of seat frames in a side view.

According to this arrangement of the present preferred embodiment of the present invention, the whole or a portion of the pump unit is disposed at the same height as that of the pair of seat frames, and at least a portion of the pump unit and the pair of seat frames are aligned in the left-right direction. Thus, an increase in vehicle height is significantly reduced or prevented compared to when the pump unit as a whole is disposed higher or lower than the pair of seat frames. As a result, an increase in the size of the motorcycle is significantly reduced or prevented.

In a preferred embodiment of the present invention, at least a portion of the pump unit may be disposed laterally of the rear wheel in a plan view.

As described above, the vehicle height adjusting motor that is a portion of the pump unit is disposed between the pair of seat frames in a plan view. Further, according to this arrangement of the present preferred embodiment of the present invention, the whole or a portion of the pump unit is disposed laterally of the rear wheel in a plan view. Thus, at least a portion of the pump unit is disposed between the seat frame and the rear wheel in a plan view. The interior space of the motorcycle is thus used efficiently. Therefore, an increase in the size of the motorcycle is significantly reduced or prevented.

In a preferred embodiment of the present invention, the pump unit may further include a protective cover to cover the vehicle height adjusting motor.

According to this arrangement of the present preferred embodiment of the present invention, because the vehicle height adjusting motor is covered with the protective cover, adhesion of water and dust to the vehicle height adjusting motor is reliably prevented. The vehicle height adjusting motor thus has an enhanced durability. That is, the life of the vehicle height adjusting motor is extended.

In a preferred embodiment of the present invention, the vehicle body frame may further include a cross member extending in the left-right direction from one of the pair of seat frames to the other of the pair of seat frames. In this case, the pump unit may extend from a position under the cross member to a position over the cross member through a through-hole that penetrates the cross member in the up-down direction.

According to this arrangement of the present preferred embodiment of the present invention, the pump unit extends from a position under the cross member to a position over the cross member through a through-hole that penetrates the cross member in the up-down direction. The interior space of the motorcycle is thus used efficiently. Therefore, an increase in the size of the motorcycle is significantly reduced or prevented.

In a preferred embodiment of the present invention, the pump unit may further include a gear mechanism to transmit a rotation of the vehicle height adjusting motor to the hydraulic pump. In this case, the gear mechanism is preferably disposed lower than the vehicle height adjusting motor.

According to this arrangement of the present preferred embodiment of the present invention, a rotation of the vehicle height adjusting motor is transmitted to the hydraulic pump via the gear mechanism. The vehicle height adjusting motor is disposed higher than the gear mechanism. Thus, lubricant to lubricate the gear mechanism is prevented from flowing toward the vehicle height adjusting motor due to gravity and entering into the interior of the vehicle height adjusting motor. Therefore, the vehicle height adjusting motor is protected from the lubricant. The vehicle height adjusting motor thus has an enhanced durability.

In a preferred embodiment of the present invention, the damper may include a cylinder filled with oil. In this case, the motorcycle may further include a sub-tank the interior of which is partitioned into an oil chamber connected to the interior of the cylinder and a gas chamber filled with gas. The sub-tank may be disposed on the opposite side to the pump unit with respect to the cylinder in the left-right direction.

According to this arrangement of the present preferred embodiment of the present invention, the sub-tank and the pump unit are disposed on mutually opposite sides with respect to the cylinder. Thus, bias in the center of gravity of the sub-tank and the pump unit with respect to the cylinder is smaller than when the sub-tank and the pump unit are disposed on the same side. That is, the center of gravity of the equipment as a whole is close to the center line of the cylinder. The motorcycle thus has enhanced stability. Particularly, when the cylinder is disposed at a vehicle center (vertical plane including a bisector that divides the vehicle body frame into two equal portions in the left-right direction in a plan view), the center of gravity is close to the vehicle center, so that the motorcycle has an enhanced straight running stability.

In a preferred embodiment of the present invention, the damper may include a cylinder filled with oil. In this case, the motorcycle may further include a hydraulic brake to apply a braking force to the motorcycle and an ABS (Anti-Lock Braking System). The ABS includes a hydraulic unit connected to the brake, and controls a hydraulic pressure to be applied to the brake by the hydraulic unit. At least a portion of the hydraulic unit may be disposed on the opposite side to the pump unit with respect to the cylinder in the left-right direction.

According to this arrangement of the present preferred embodiment of the present invention, the hydraulic unit and the pump unit are disposed on mutually opposite sides with respect to the cylinder. Thus, a bias in the center of gravity of the hydraulic unit and the pump unit with respect to the cylinder is smaller than when the hydraulic unit and the pump unit are disposed on the same side. The motorcycle thus has an enhanced stability. Particularly, when the cylinder is disposed at a vehicle center, the motorcycle has an enhanced straight running stability.

In a preferred embodiment of the present invention, the damper may include a cylinder filled with oil. In this case, the motorcycle may further include a sub-tank the interior of which is partitioned into an oil chamber connected to the interior of the cylinder and a gas chamber filled with gas, a hydraulic brake to apply a braking force to the motorcycle, and an ABS (Anti-Lock Braking System). The ABS has a hydraulic unit connected to the brake, and controls a hydraulic pressure to be applied to the brake by the hydraulic unit. The sub-tank may be disposed on the opposite side to the pump unit with respect to a vehicle center in the left-right direction. Further, at least a portion of the hydraulic unit is disposed on the opposite side to the pump unit with respect to the vehicle center.

According to this arrangement of the present preferred embodiment of the present invention, the sub-tank is disposed on the opposite side to the pump unit with respect to the vehicle center (vertical plane including a bisector that divides the vehicle body frame into two equal portions in the left-right direction in a plan view) in the left-right direction. Similarly, at least a portion of the hydraulic unit is disposed on the opposite side to the pump unit with respect to the vehicle center. The pump unit is a heavy object including the hydraulic pump and the vehicle height adjusting motor. Thus, by disposing the sub-tank and the hydraulic unit on the opposite side to the pump unit, the center of gravity of the motorcycle is located closer to the vehicle center. The motorcycle thus has an enhanced stability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The front-rear, up-down (upper/lower), and left-right directions in the following description are defined on the basis of a reference posture of a motorcycle 1 which travels straight ahead on a horizontal plane as seen from a viewpoint of a forward-facing driver of the motorcycle 1. The left-right direction corresponds to a vehicle width direction.

Figure 1:
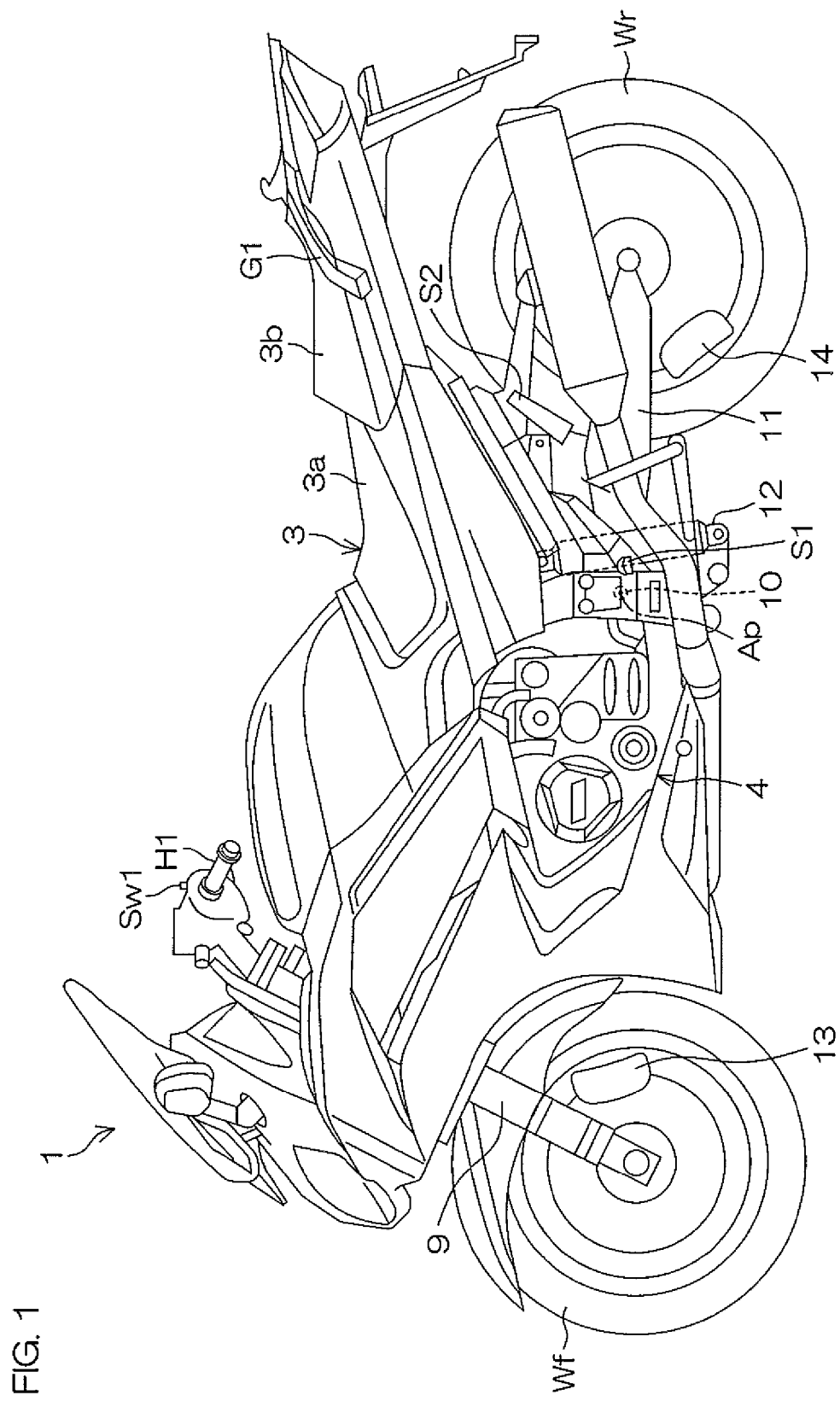
FIG. 1 is a left side view of a motorcycle according to a preferred embodiment of the present invention.
Figure 2:
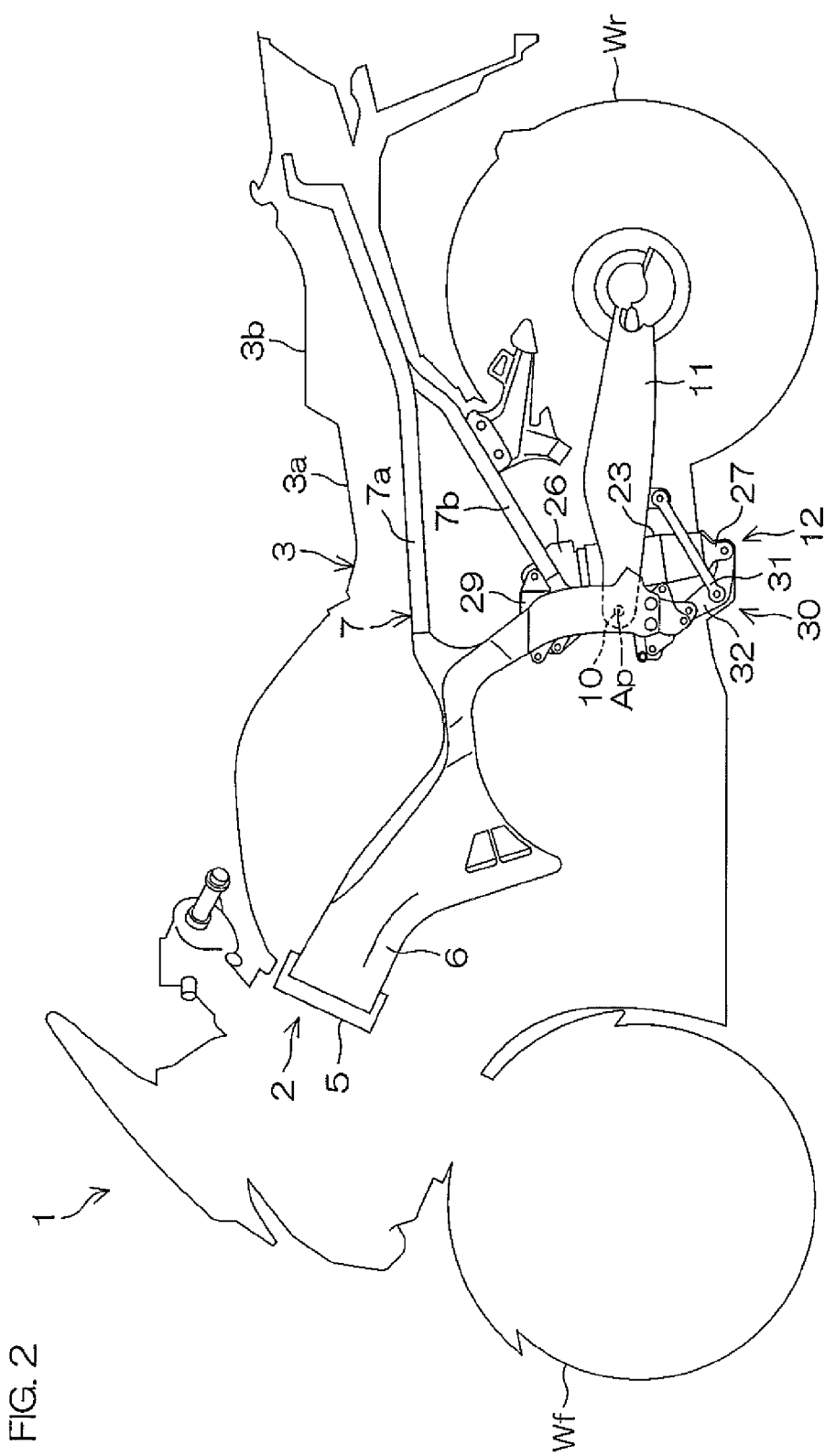
FIG. 2 is a left side view of a vehicle body frame.
Figure 3:
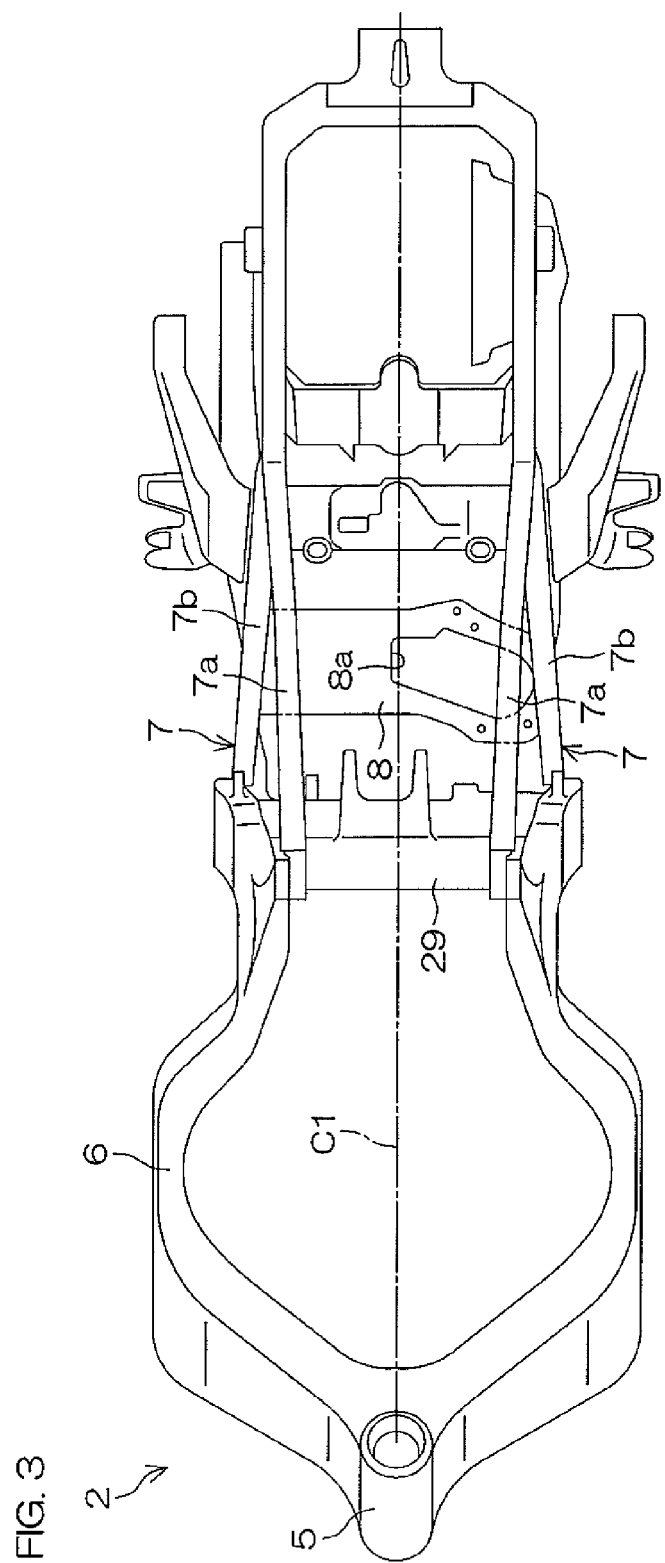
FIG. 3 is a plan view of the vehicle body frame.
Figure 4:
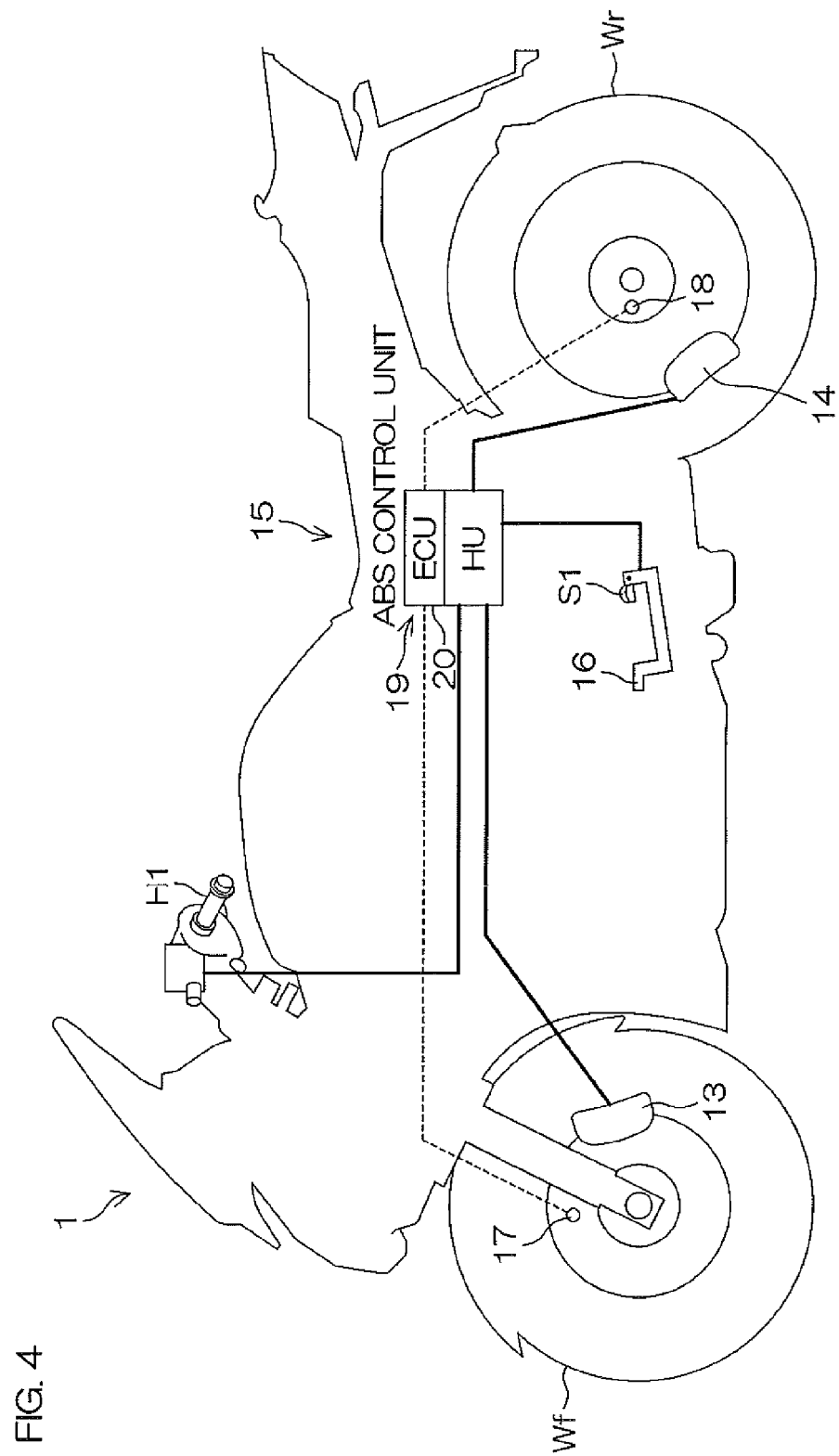
FIG. 4 is a conceptual view for explaining an ABS.

FIG. 1 is a left side view of a motorcycle 1 according to a preferred embodiment of the present invention. FIG. 2 is a left side view of a vehicle body frame 2. FIG. 3 is a plan view of the vehicle body frame 2. FIG. 4 is a conceptual view for explaining an ABS 15.

As shown in FIG. 1 and FIG. 2, the motorcycle 1 includes a front wheel Wf and a rear wheel Wr, a vehicle body frame 2 that supports the front wheel Wf and the rear wheel Wr, and a seat 3 disposed over the vehicle body frame 2. The motorcycle 1 further includes an engine 4 (preferably an internal combustion engine) that generates a motive power to cause the motorcycle 1 to travel and a drive mechanism that transmits the motive power of the engine 4 to the rear wheel Wr.

As shown in FIG. 2 and FIG. 3, the vehicle body frame 2 includes a head pipe 5 that extends obliquely upward to the rear, a main frame 6 that extends obliquely downward to the rear from the head pipe 5, a pair of left and right seat frames 7 that extend rearward from the main frame 6, and a cross member 8 that couples the pair of seat frames 7. As shown in FIG. 3, the pair of seat frames 7 extend in the front-rear direction. The pair of seat frames 7 are spaced apart and oppose each other in the vehicle width direction. The cross member 8 extends from one seat frame 7 to the other seat frame 7. As shown in FIG. 2, each seat frame 7 has a Y-shape that is opened to the front as seen in a side view, and includes an upper frame 7a that extends rearward from the main frame 6 and a lower frame 7b that extends rearward from the main frame 6 to the upper frame 7a at a position lower than that of the upper frame 7a.

As shown in FIG. 1, the seat 3 is disposed over the pair of seat frames 7. The seat 3 is supported by the pair of seat frames 7. The seat 3 extends in the front-rear direction. The seat 3 may seat one person or seat two persons. FIG. 1 shows an example where a two-person seat, including a driver seat 3a on which a driver sits and a tandem seat 3b on which a passenger sits, is used as the seat 3. The motorcycle 1 includes steps S1 on which the feet of the driver are set, steps S2 on which the feet of the passenger are set, and a grip G1 to be gripped by the passenger. The grip G1 is disposed along an edge portion of a rear portion of the seat 3. The grip G1 is fixed to the seat frames 7.

As shown in FIG. 1, the motorcycle 1 includes a handle H1 that is operated by the driver and a front fork 9 that rotates about a central axis of a steering shaft together with the handle H1 and the front wheel Wf.

As shown in FIG. 1, the front fork 9 rotatably supports the front wheel Wf. The front fork 9 is supported on the head pipe 5. The front wheel Wf is thus supported on the vehicle body frame 2 via the front fork 9. The steering shaft of the front fork 9 is inserted inside the head pipe 5 of the vehicle body frame 2. The steering shaft is rotatable about a steering axis (central axis of the steering shaft) with respect to the head pipe 5. The handle H1 is attached to the front fork 9 at a position higher than that of the head pipe 5. The handle H1 is disposed further to the front than the seat 3 at a height higher than that of the seat 3. When the handle H1 is operated, the front wheel Wf and the front fork 9 rotate to the left or right together with the handle H1. The motorcycle 1 is thus steered.

As shown in FIG. 1, the motorcycle 1 includes a pivot shaft 10 that extends in the vehicle width direction behind the engine 4, a pair of left and right swing arms 11 that swing in the up-down direction about a central axis (pivot axis Ap) of the pivot shaft 10 together with the rear wheel Wr, and a rear suspension 12 that absorbs vibrations between the rear wheel Wr and the vehicle body frame 2.

As shown in FIG. 1, the pivot shaft 10 is disposed behind the engine 4 in a side view. The pivot shaft 10 is attached to the vehicle body frame 2. The swing arm 11 extends rearward from the pivot shaft 10. The swing arm 11 is attached to the vehicle body frame 2 via the pivot shaft 10. The swing arm 11 is swingable in the up-down direction with respect to the vehicle body frame 2 about the pivot axis Ap.

As shown in FIG. 1, the rear wheel Wr is rotatably supported on a rear end portion of the swing arm 11. The rear wheel Wr is supported on the vehicle body frame 2 via the pivot shaft 10 and the swing arm 11. The rear wheel Wr is thus swingable in the up-down direction with respect to the vehicle body frame 2 within a swing region between an upper position and a lower position. The rear wheel Wr is disposed under the seat 3 and behind the engine 4. The rear wheel Wr is disposed under the pair of seat frames 7 in a side view.

As shown in FIG. 4, the motorcycle 1 includes a hydraulic front brake 13 and a hydraulic rear brake 14 that apply a braking force to the front wheel Wf and the rear wheel Wr and an ABS 15 that prevents the front wheel Wf and the rear wheel Wr from locking by controlling a hydraulic pressure to be applied to the front brake 13 and the rear brake 14.

As shown in FIG. 4, the front brake 13 and the rear brake 14 are attached to the front wheel Wf and the rear wheel Wr, respectively. The front brake 13 is connected to a brake lever provided on the handle H1. The front brake 13 is operated by the brake lever. The rear brake 14 is connected to a brake pedal 16 provided in front of the right step S1. The rear brake 14 is operated by the brake pedal 16.

As shown in FIG. 4, the ABS 15 includes a front wheel speed detecting device 17 that detects a rotation speed of the front wheel Wf, a rear wheel speed detecting device 18 that detects a rotation speed of the rear wheel Wr, and a control unit 19 that controls a hydraulic pressure to be applied to the front brake 13 and the rear brake 14 based on detection values of the front wheel speed detecting device 17 and the rear wheel speed detecting device 18. The front wheel speed detecting device 17 and the rear wheel speed detecting device 18 are attached to the front wheel Wf and the rear wheel Wr, respectively, and the control unit 19 is attached to the vehicle body frame 2.

As shown in FIG. 4, the control unit 19 includes a hydraulic unit HU connected to the front brake 13 and the rear brake 14 and an ECU 20 (Electronic Control Unit) that controls the hydraulic unit HU based on the front wheel speed detecting device 17 and the rear wheel speed detecting device 18. The hydraulic unit HU is attached to the vehicle body frame 2, and the ECU 20 is attached to the hydraulic unit HU.

The hydraulic unit HU includes a main body that defines an oil passage connected to the front brake 13 and the rear brake 14, a valve incorporated in the main body, a pump that feeds brake oil to the front brake 13 and the rear brake 14 via the oil passage of the main body, and a motor that drives the pump. The ECU 20 controls the valve and motor of the hydraulic unit HU based on detection values of the front wheel speed detecting device 17 and the rear wheel speed detecting device 18. A braking force to be applied to the front wheel Wf and the rear wheel Wr is thus adjusted to prevent the front wheel Wf and the rear wheel Wr from locking.

Figure 5:
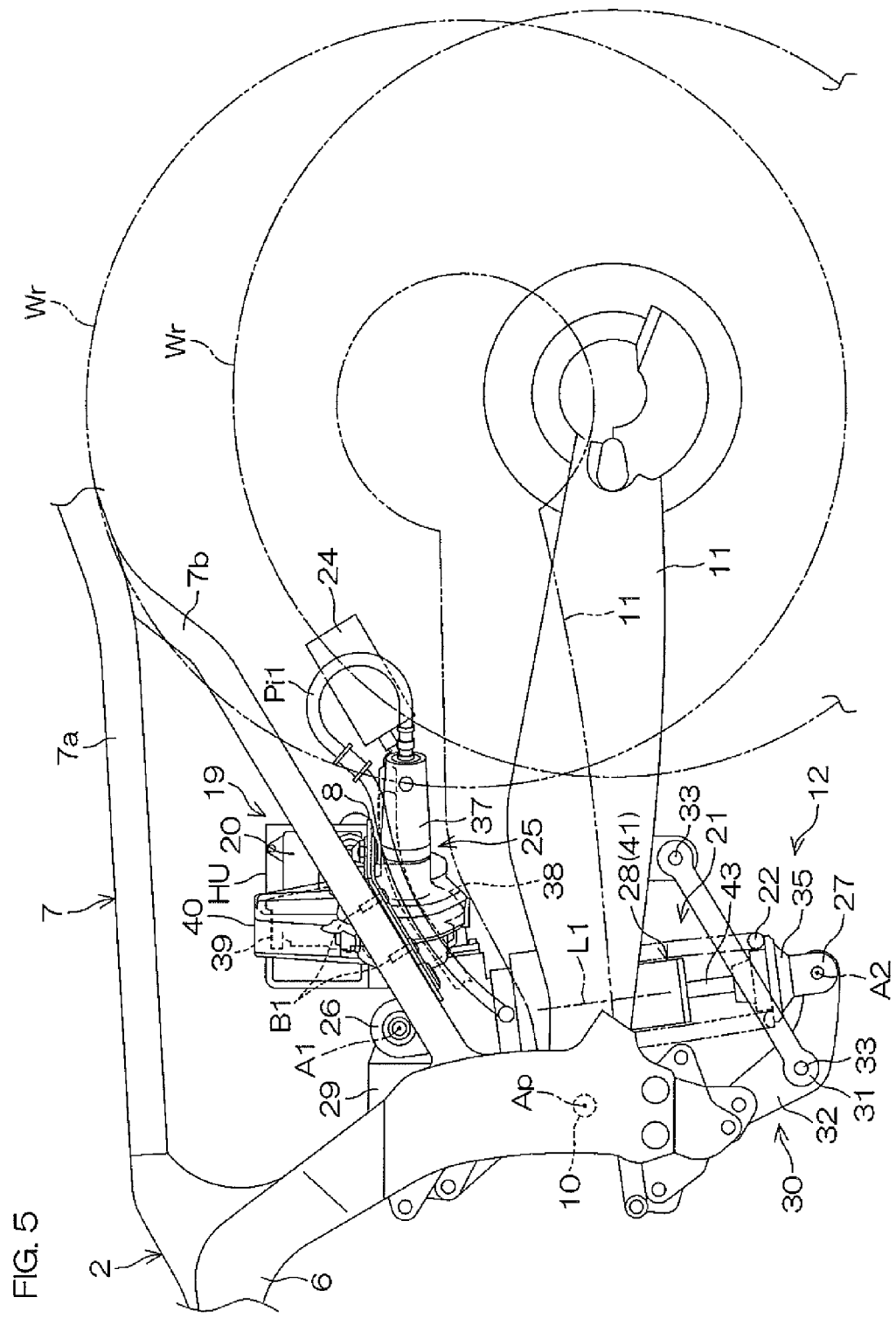
FIG. 5 is a left side view showing a positional relationship between the rear wheel and rear suspension.

FIG. 5 is a left side view showing a positional relationship between the rear wheel Wr and the rear suspension 12.

Figure 6:
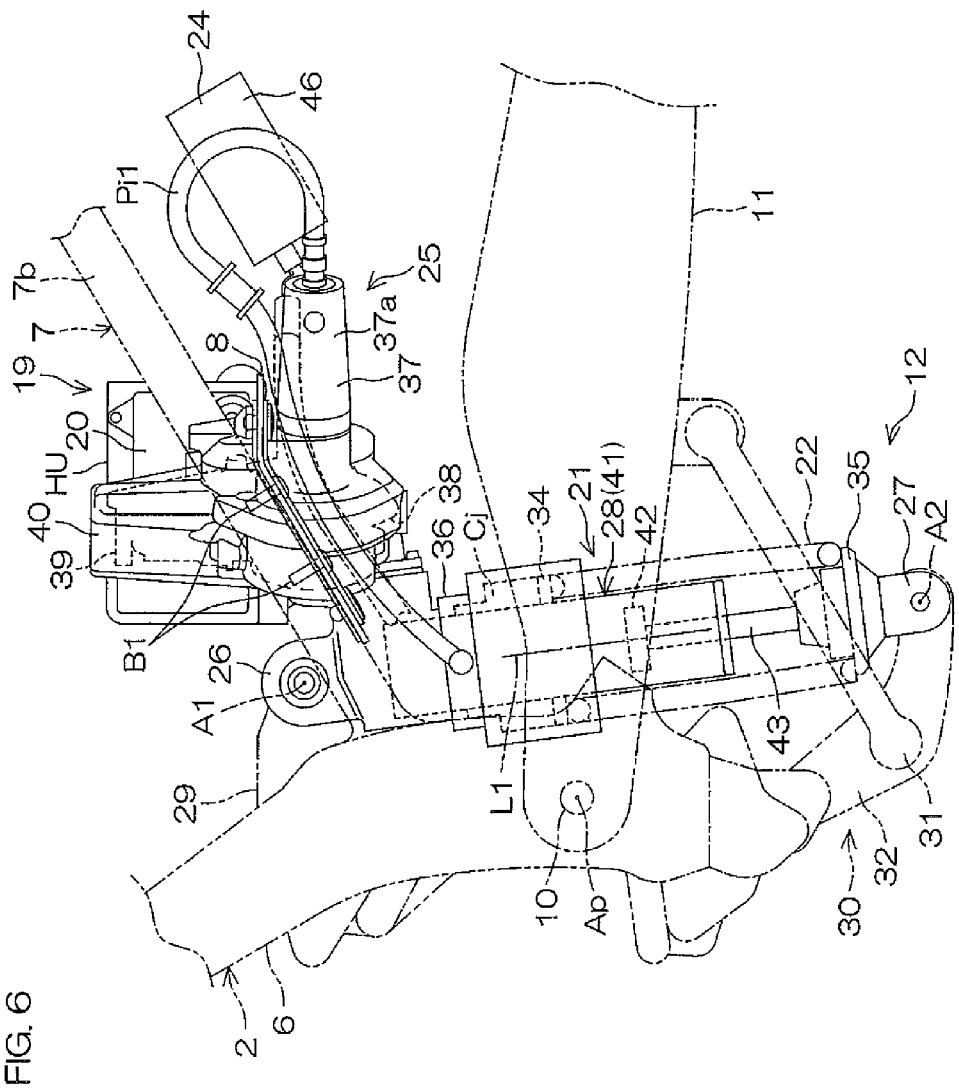
FIG. 6 is a left side view of the rear suspension in a state in which the rear suspension is attached to the vehicle body frame.
Figure 7:
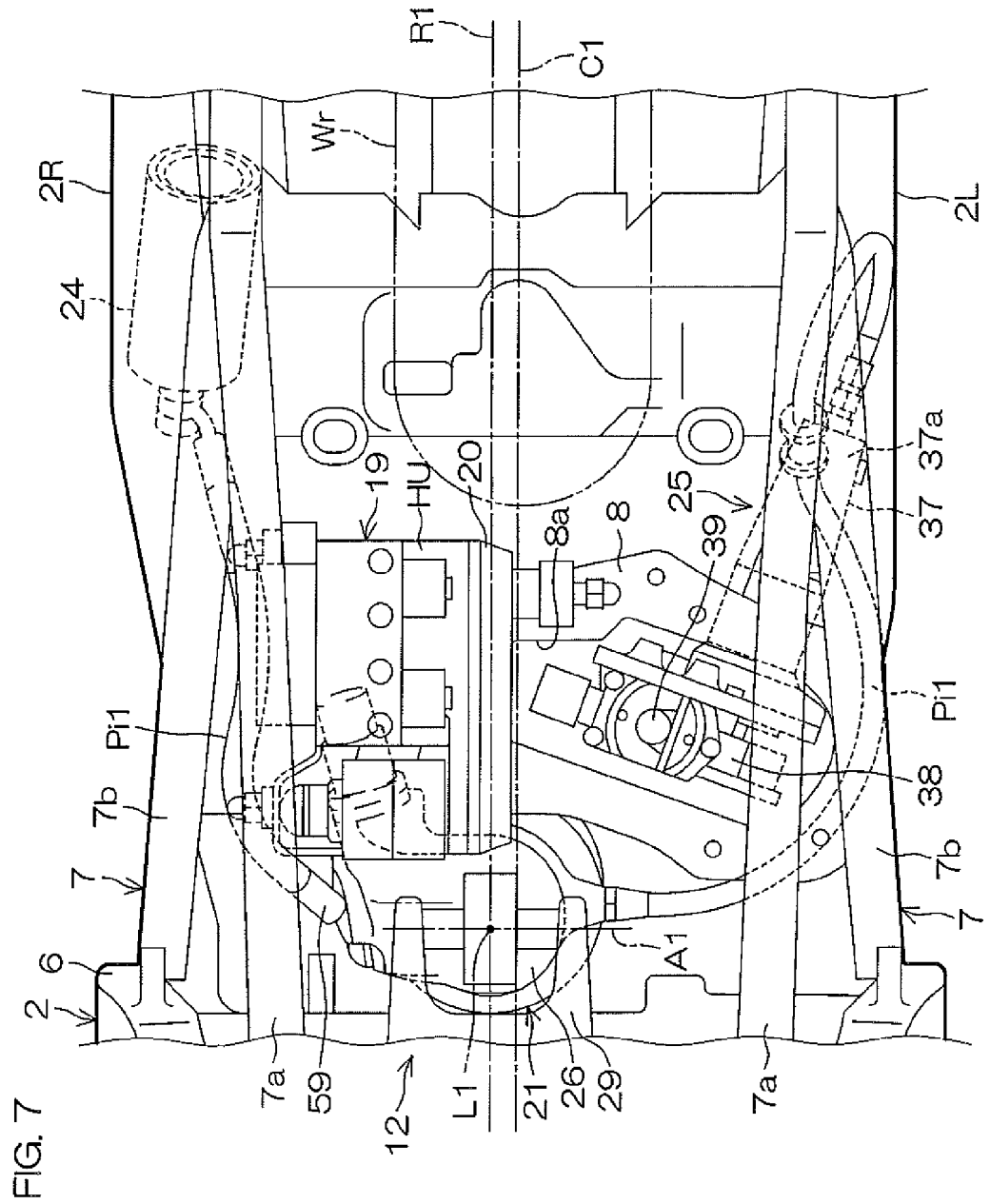
FIG. 7 is a plan view of the rear suspension in a state in which the rear suspension is attached to the vehicle body frame.
Figure 8:
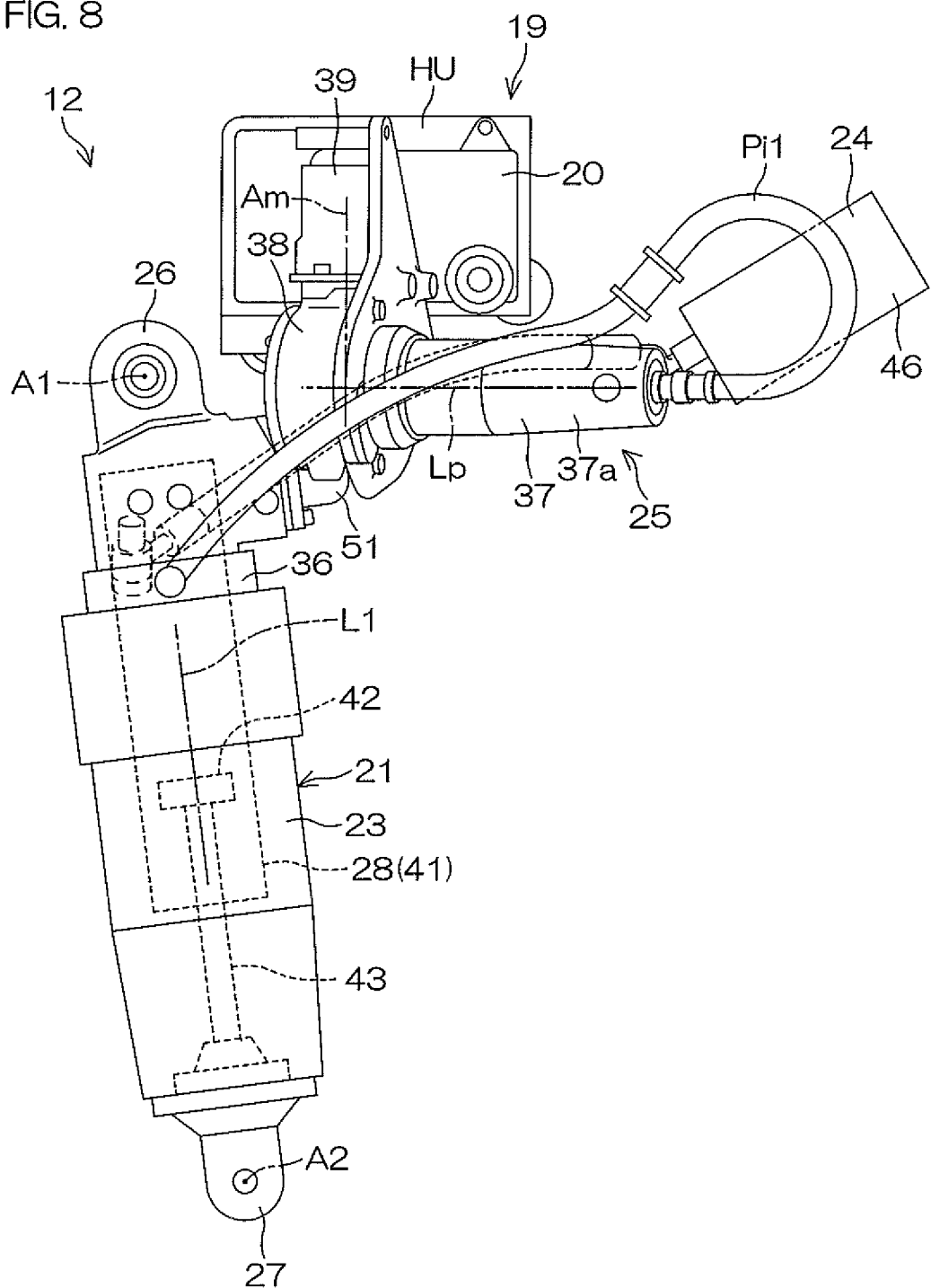
FIG. 8 is a left side view of the rear suspension.
Figure 9:
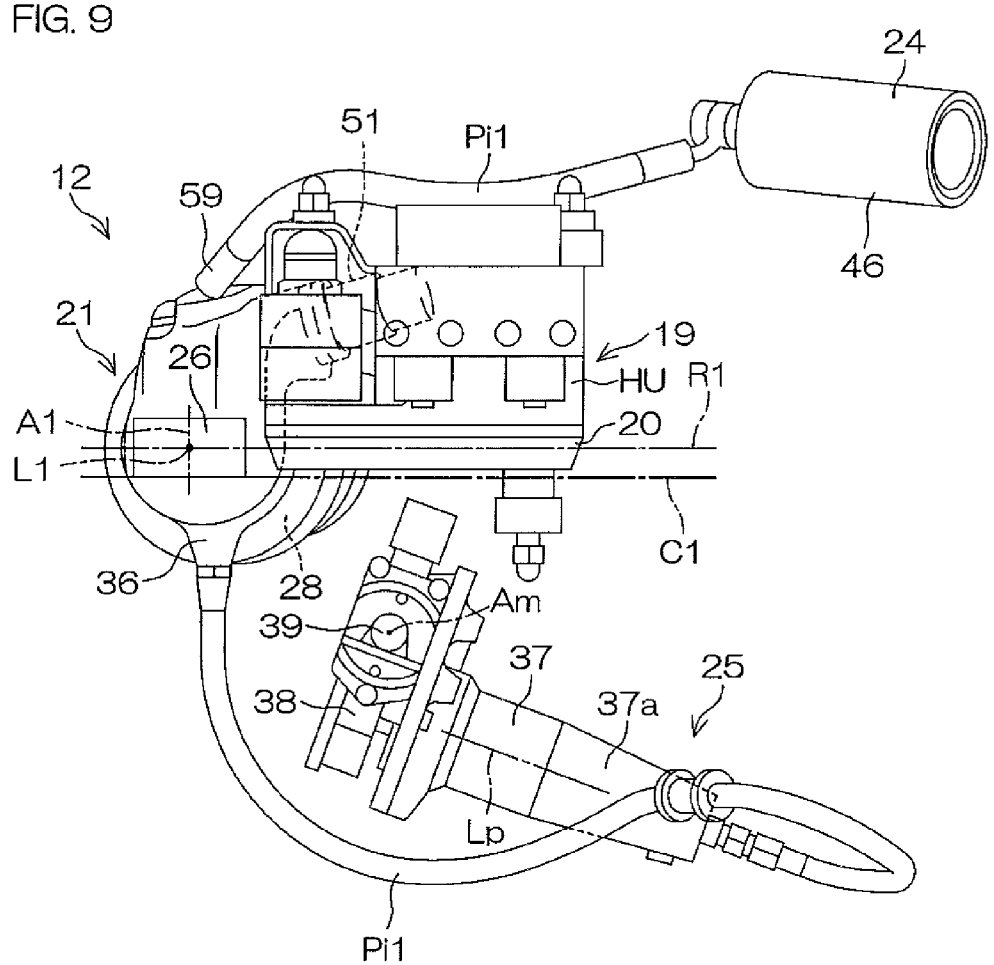
FIG. 9 is a plan view of the rear suspension.

FIG. 6 is a left side view of the rear suspension 12 in a state in which the rear suspension 12 is attached to the vehicle body frame 2. FIG. 7 is a plan view of the rear suspension 12 in a state in which the rear suspension 12 is attached to the vehicle body frame 2. FIG. 8 is a left side view of the rear suspension 12. FIG. 9 is a plan view of the rear suspension 12.

The rear suspension 12 is preferably an electric suspension device including an electrically-operated vehicle height adjusting mechanism (preload adjusting mechanism) and a damping force adjusting mechanism to be remotely controlled by a switch Sw1 (refer to FIG. 1) provided on the handle H1. As shown in FIG. 5, the rear suspension 12 includes an axially extensible and contractible cushioning unit including a damper 21 and a spring 22.

As shown in FIG. 5, the damper 21 is held in a standing posture such that one end portion of the damper 21 is located higher than the other end portion of the damper 21. The spring 22 is preferably a metallic compression coil spring, and surrounds the damper 21 about a center line L1 of the damper 21. The spring 22 is disposed in a tubular casing 23 (refer to FIG. 8) that coaxially surrounds the damper 21. The damper 21 is axially extensible and contractible. The spring 22 is axially compressed by the damper 21. The damper 21 is thus pushed in the extending direction by a restoring force of the spring 22.

As shown in FIG. 5, the rear suspension 12 includes a sub-tank 24 filled with oil and gas, a pump unit 25 that adjusts the axial length of the cushioning unit, and piping Pit that connects each of the sub-tank 24 and the pump unit 25 to the damper 21.

As shown in FIG. 5, the sub-tank 24 and the pump unit 25 are disposed higher than a lower end portion of the damper 21. As shown in FIG. 7, the sub-tank 24 is disposed further to the right than the damper 21 in a plan view, and a portion of the pump unit 25 is disposed further to the left than the damper 21 in a plan view. The cross member 8 is disposed behind the damper 21. The cross member 8 is disposed over the pump unit 25. The pump unit 25 extends from a position under the cross member 8 to a position over the cross member 8 through a through-hole 8a that penetrates the cross member 8 in the up-down direction. Thus, a portion of the pump unit 25 such as a vehicle height adjusting motor 39 is disposed higher than the cross member 8.

As shown in FIG. 7, the damper 21 is disposed between the pair of seat frames 7 in a plan view. The damper 21 is disposed at a position to overlap a vehicle center C1 (vertical plane including a bisector that divides the vehicle body frame 2 into two equal portions in the left-right direction in a plan view). The center line L1 of the damper 21 is preferably disposed laterally of the vehicle center C1 (in a direction spaced in the vehicle width direction from the vehicle center C1). As shown in FIG. 6, the center line L1 of the damper 21 is inclined in the front-rear direction so that the upper end of the damper 21 is located toward the front. The damper 21 thus extends obliquely upward to the front. The center line L1 of the damper 21 extends in the front-rear direction in a plan view.

As shown in FIG. 6, the damper 21 includes an upper mount 26 coupled to the vehicle body frame 2, a lower mount 27 coupled to the vehicle body frame 2 via the swing arm 11, and a cylinder 28 that axially extends and contracts between the upper mount 26 and the lower mount 27.

As shown in FIG. 6, the upper mount 26 is provided at an upper end portion of the damper 21, and the lower mount 27 is provided at a lower end portion of the damper 21. The cylinder 28 is disposed between the upper mount 26 and the lower mount 27. The cylinder 28 is joined to the upper mount 26 and the lower mount 27. The cylinder 28 includes a cylinder tube 41, a piston 42 disposed in the cylinder tube 41, and a piston rod 43 that axially projects from a lower end portion of the cylinder tube 41. The upper mount 26 is coupled to the cylinder tube 41, and the lower mount 27 is coupled to the piston rod 43. The lower mount 27 moves axially together with the piston rod 43. Thus, when the upper mount 26 and the lower mount 27 relatively move axially, the cylinder 28 extends or contracts.

As shown in FIG. 5, the motorcycle 1 includes an upper bracket 29 that couples the upper mount 26 and the vehicle body frame 2 and a link mechanism 30 that couples the lower mount 27 and the swing arm 11.

As shown in FIG. 5, the upper mount 26 is coupled to the upper bracket 29 at a position further to the rear than the main frame 6 and the pivot shaft 10. The upper mount 26 preferably overlaps the lower frame 7b of the seat frame 7 in a side view. An upper end portion of the upper mount 26 is disposed higher than the lower frame 7b in a side view, and a lower end portion of the upper mount 26 is disposed lower than the lower frame 7b in a side view. The upper mount 26 is disposed over the swing arm 11 in a side view. The swing arm 11 is disposed over the lower mount 27 in a side view, and overlaps the cylinder 28 in a side view.

As shown in FIG. 5, the link mechanism 30 includes a plurality of links including a first link 31 and a second link 32 and a plurality of coupling pins 33 that couple the plurality of links so as to be relatively rotatable. The first link 31 is disposed further to the side than the damper 21. The first link 31 overlaps the damper 21 in a side view. The first link 31 is coupled to the swing arm 11 at a position further to the rear than the pivot axis Ap. The first link 31 couples the swing arm 11 to the second link 32. The second link 32 extends forward from the lower mount 27 in a side view. The second link 32 couples the first link 31 to the lower mount 27. The lower mount 27 is thus coupled to the swing arm 11. The damper 21 is thus coupled to the vehicle body frame 2 via the link mechanism 30, the swing arm 11, and the pivot shaft 10.

As shown in FIG. 5, the upper mount 26 is rotatable with respect to the vehicle body frame 2 about an upper mounting axis A1 extending in the left-right direction. The lower mount 27 is rotatable with respect to the vehicle body frame 2 about a lower mounting axis A2 extending in the left-right direction. Thus, the cylinder 28 is supported on the vehicle body frame 2 so as to be rotatable about the upper mounting axis A1 and the lower mounting axis A2. The lower mounting axis A2 is parallel or substantially parallel with the upper mounting axis A1, and disposed further to the rear than the upper mounting axis A1. The upper mounting axis A1 is disposed over the lower frame 7b and the swing arm 11 in a side view, and the lower mounting axis A2 is disposed under the lower frame 7b and the swing arm 11 in a side view. The pivot axis Ap is disposed at a height between the upper mounting axis A1 and the lower mounting axis A2 at a position further to the front than the upper mounting axis A1 and the lower mounting axis A2.

As shown in FIG. 9, the sub-tank 24 is disposed on the opposite side to the pump unit 25 with respect to the cylinder 28 in the vehicle width direction. More specifically, the sub-tank 24 is disposed on the right side of a reference plane R1, and the pump unit 25 is disposed on the left side of the reference plane R1. The reference plane R1 is a plane that is orthogonal or substantially orthogonal to the upper mounting axis A1 and includes a center line L1 of the cylinder 28. The center line L1 of the cylinder 28 corresponds to the center line L1 of the damper 21. Further, the sub-tank 24 is disposed on the right side of the vehicle center C1, and the pump unit 25 is disposed on the left side of the vehicle center C1. Thus, the sub-tank 24 and the pump unit 25 are disposed on mutually opposite sides with respect to the reference plane R1, and disposed on mutually opposite sides with respect to the vehicle center C1.

As shown in FIG. 8, the sub-tank 24 and the pump unit 25 are disposed further to the rear than the upper mounting axis A1 at heights to overlap with a horizontal plane including the upper mounting axis A1. As shown in FIG. 5, the rear wheel Wr is swingable in the up-down direction with respect to the vehicle body frame 2 within a swing region between an upper position (position of the alternate long and two short dashed line) and a lower position (position of the alternate long and short dashed line). The sub-tank 24 overlaps in a side view with the rear wheel Wr located at the upper position, and overlaps in a side view with the rear wheel Wr located at the lower position. Thus, even when the rear wheel Wr is located at either position in the swing region, the sub-tank 24 overlaps the rear wheel Wr in a side view.

As shown in FIG. 5, the hydraulic unit HU is disposed further to the rear than the upper mounting axis A1. The hydraulic unit HU is disposed further to the front than the sub-tank 24. The hydraulic unit HU is thus disposed between the upper mounting axis A1 and the sub-tank 24 in the front-rear direction. As shown in FIG. 9, a front end portion of the hydraulic unit HU is disposed over the damper 21, and overlaps the damper 21 in a plan view. As shown in FIG. 8, a portion of the pump unit 25 and the hydraulic unit HU are aligned in the vehicle width direction, and the portion of the pump unit 25 overlaps the hydraulic unit HU in a side view.

As shown in FIG. 9, a portion of the control unit 19 is disposed on the right side of the reference plane R1 and the vehicle center C1. Specifically, a portion of the hydraulic unit HU is disposed on the opposite side to the pump unit 25 with respect to the cylinder 28 in the vehicle width direction. The hydraulic unit HU is disposed on the right side of the reference plane R1. The ECU 20 is disposed at a position to overlap the reference plane R1. The hydraulic unit HU is disposed on the opposite side to the pump unit 25 with respect to the reference plane R1 and the vehicle center C1.

As shown in FIG. 6, the damper 21 includes two spring bearings (an upper spring bearing 34 and a lower spring bearing 35) that sandwich the spring 22 axially therebetween.

As shown in FIG. 6, the upper spring bearing 34 is disposed higher than the lower spring bearing 35. The upper spring bearing 34 is fixed in position relative to the cylinder tube 41, and the lower spring bearing 35 is coupled to the piston rod 43 that is axially movable with respect to the cylinder tube 41. The lower spring bearing 35 moves axially together with the piston rod 43. The upper spring bearing 34 and the lower spring bearing 35 are thus relatively movable axially. The spring 22 is disposed between the upper spring bearing 34 and the lower spring bearing 35. The spring 22 is elastically deformed axially within an elasticity range by compression by the upper spring bearing 34 and the lower spring bearing 35. When the upper spring bearing 34 and the lower spring bearing 35 relatively move in the axial direction of the damper 21, the amount of elastic deformation of the spring 22 in the axial direction changes, and the damper 21 extends or contracts. The axial direction of the damper 21 therefore changes.

As shown in FIG. 6, the rear suspension 12 includes a hydraulic jack portion 36 provided on the damper 21. The hydraulic jack portion 36 is arranged around the cylinder 28. The hydraulic jack portion 36 defines a jack chamber Cj filled with oil around the cylinder tube 41. The jack chamber Cj is tubular, and surrounds the cylinder tube 41. The jack chamber Cj is disposed over the upper spring bearing 34. The upper spring bearing 34 is axially movable with respect to the cylinder tube 41. The upper spring bearing 34 is held at a constant position by the hydraulic jack portion 36.

As shown in FIG. 6, the pump unit 25 is attached to the cross member 8 by a plurality of bolts B1. The pump unit 25 includes a hydraulic pump 37 that feeds oil to the hydraulic jack portion 36, a gear mechanism 38 that transmits a motive power to the hydraulic pump 37, and a vehicle height adjusting motor 39 that drives the hydraulic pump 37 via the gear mechanism 38. The pump unit 25 further includes a protective cover 40 that covers the gear mechanism 38 and the vehicle height adjusting motor 39.

As shown in FIG. 6, the hydraulic pump 37 is disposed further to the rear than the upper mounting axis A1 at a height to overlap a horizontal plane including the upper mounting axis A1. As shown in FIG. 7, the hydraulic pump 37 extends in a direction inclined with respect to the front-rear direction in a plan view so that the front end of the hydraulic pump 37 is located closer to the reference plane R1 and the vehicle center C1 than the rear end of the hydraulic pump 37. A rear end portion of the hydraulic pump 37 is disposed laterally of the rear wheel Wr in a plan view. A portion of the pump unit 25 is thus disposed laterally of the rear wheel Wr in a plan view. As shown in FIG. 5, the hydraulic pump 37 overlaps in a side view with the rear wheel Wr located at the upper position, and does not overlap in a side view with the rear wheel Wr located at the lower position. A portion of the swing region thus overlaps the pump unit 25 in a side view.

The vehicle height adjusting motor 39 is an electric motor including a rotor and a stator. As shown in FIG. 6, the vehicle height adjusting motor 39 (rotor and stator) is disposed higher than the hydraulic pump 37. The vehicle height adjusting motor 39 is disposed higher than the upper mounting axis A1. As shown in FIG. 7, the vehicle height adjusting motor 39 is disposed in front of the hydraulic pump 37 in a plan view. Similarly, the gear mechanism 38 is disposed in front of the hydraulic pump 37 in a plan view. The gear mechanism 38 is coupled to a front end portion of the hydraulic pump 37, and the vehicle height adjusting motor 39 is coupled to the gear mechanism 38. The vehicle height adjusting motor 39 is disposed over the gear mechanism 38. Thus, lubricant such as grease to lubricate the gear mechanism 38 is unlikely to flow from the gear mechanism 38 toward the vehicle height adjusting motor 39.

As shown in FIG. 7, the vehicle height adjusting motor 39 is disposed between the pair of seat frames 7 in a plan view.

The vehicle height adjusting motor 39 is thus disposed under the seat 3. The entire pump unit 25 is disposed between a right end edge 2R and a left end edge 2L of the vehicle body frame 2 in a plan view. In FIG. 7, the right end edge 2R and the left end edge 2L are shown by thick lines. As shown in FIG. 6, the vehicle height adjusting motor 39 and the vehicle mechanism 38 overlap the lower frame 7b of the seat frame 7 in a side view. A portion of the pump unit 25 thus overlaps the seat frame 7 in a side view. The vehicle height adjusting motor 39 may be disposed at a height between the upper frame 7a and the lower frame 7b so as not to overlap the seat frame 7 in a side view.

The hydraulic pump 37 is a piston pump that is an example of a positive displacement pump. The hydraulic pump 37 may be another type of pump such as a gear pump. The hydraulic pump 37 according to the present preferred embodiment includes a tubular pump housing 37a, a screw shaft extending in the axial direction of the pump housing 37a in the pump housing 37a, a nut attached to the outer periphery of the screw axis in the pump housing 37a, and a piston disposed in the pump housing 37a. As shown in FIG. 8, a center line Lp of the hydraulic pump 37 (center line of the tubular pump housing 37a) intersects a rotation axis Am of the vehicle height adjusting motor 39 in a side view. The vehicle height adjusting motor 39 and the hydraulic pump 37 are thus disposed on mutually different straight lines.

The interior of the pump housing 37a is connected to the jack chamber Cj by the piping Pi1. When the screw shaft rotates about its central axis, the rotation of the screw shaft is transformed into a linear movement of the nut in the axial direction of the pump housing 37a. The piston moves in the axial direction of the pump housing 37a together with the nut. Thus, when the screw shaft is driven to rotate, the piston moves in the axial direction of the pump housing 37a inside the pump housing 37a, and oil is discharged or drawn in.

The gear mechanism 38 includes a plurality of gears applied with lubricant. The gear mechanism 38 according to the present preferred embodiment includes a mutually engaging worm and worm wheel. The gears are not limited to worms and worm wheels, and may be other types of gears such as spur gears or helical gears. The worm is coupled to the rotation shaft of the vehicle height adjusting motor 39, and the worm wheel is coupled to the screw shaft of the hydraulic pump 37. A rotation of the vehicle height adjusting motor 39 is decelerated by the gear mechanism 38 serving as a deceleration mechanism, and then transmitted to the screw shaft of the hydraulic pump 37. The piston of the hydraulic pump 37 thus moves axially.

When the oil from the pump unit 25 is supplied to the interior (jack chamber Cj) of the hydraulic jack portion 36, the hydraulic pressure in the jack chamber Ci is applied to the upper spring bearing 34, and the upper spring bearing 34 moves toward the lower spring bearing 35. The axial distance between the upper spring bearing 34 and the lower spring bearing 35 is thus reduced, and the spring 22 is further compressed axially. Therefore, the damper 21 axially contracts to lower the vehicle height (height of the seating surface of the seat 3). On the other hand, when the oil in the hydraulic jack portion 36 is drawn out by the pump unit 25, the elastic restoring force of the spring 22 causes the upper spring bearing 34 to move in a direction to separate from the lower spring bearing 35. The damper 21 is thus extended to increase the vehicle height.

Figure 10:
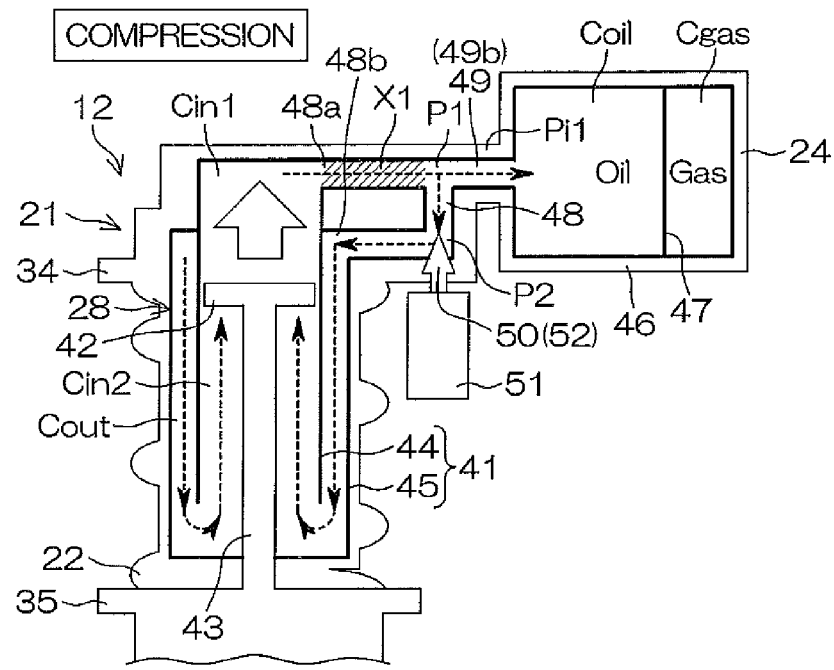
FIG. 10 is a schematic view showing a cylinder, a sub-tank, a damping force adjusting valve, and a damping force adjusting motor when a damper is compressed.
Figure 11:
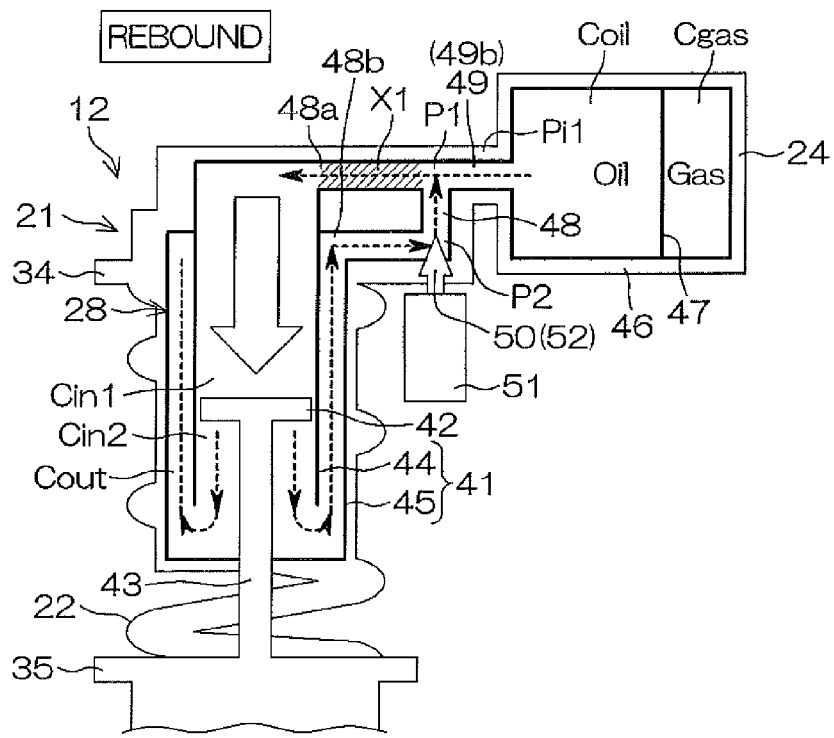
FIG. 11 is a schematic view showing the cylinder, the sub-tank, a damping force adjusting valve, and the damping force adjusting motor when the damper rebounds.
Figure 12:
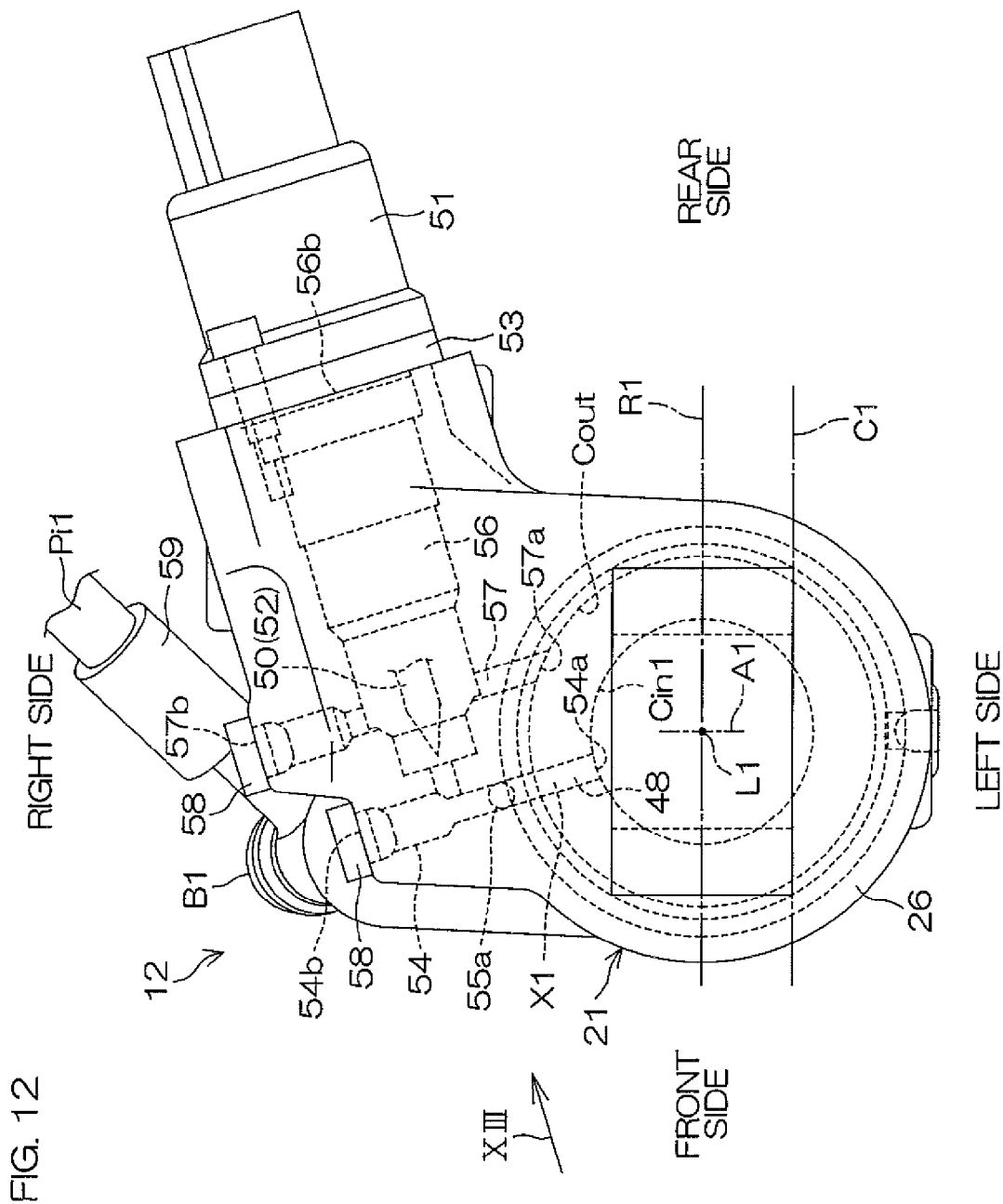
FIG. 12 is a plan view of the damper, damping force adjusting valve, and damping force adjusting motor.
Figure 13:
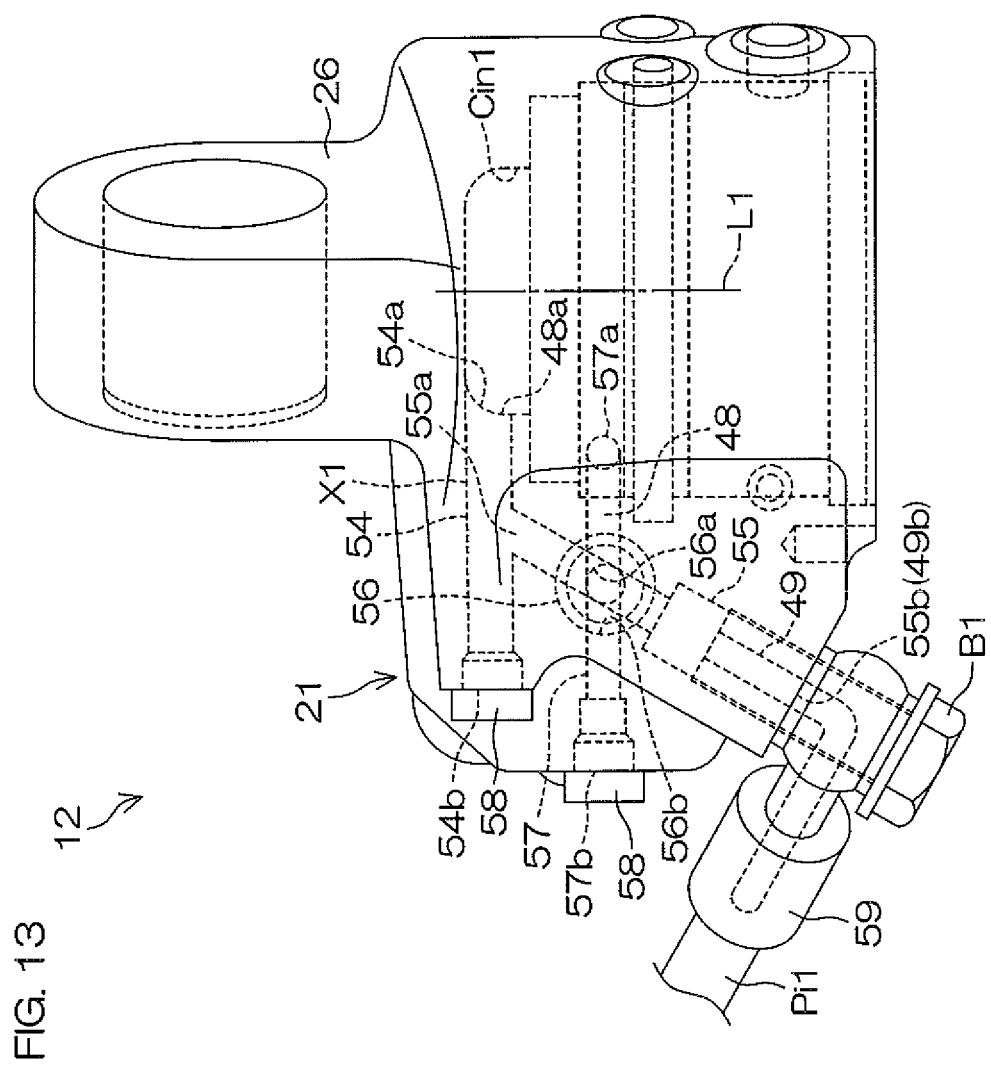
FIG. 13 is a view of the damper observed in a direction of the arrow XIII of FIG. 12.

FIG. 10 is a schematic view showing the cylinder 28, the sub-tank 24, a damping force adjusting valve 50, and a damping force adjusting motor 51 when the damper 21 is compressed. FIG. 11 is a schematic view showing the cylinder 28, the sub-tank 24, the damping force adjusting valve 50, and the damping force adjusting motor 51 when the damper 21 rebounds. FIG. 12 is a plan view of the damper 21, the damping force adjusting valve 50, and the damping force adjusting motor 51. FIG. 13 is a view of the damper 21 observed in a direction of the arrow XIII of FIG. 12.

As shown in FIG. 10 and FIG. 11, the cylinder 28 is a twin-tube cylinder including an inner tube 44 and an outer tube 45. The cylinder 28 includes a double cylinder tube 41, a piston 42 disposed in the cylinder tube 41, and a piston rod 43 that axially projects from a lower end portion of the cylinder tube 41. The cylinder tube 41 includes an inner tube 44 extending in the axial direction of the damper 21 and an outer tube 45 coaxially surrounding the inner tube 44 and radially spaced from the inner tube 44. The piston 42 is disposed in the inner tube 44.

As shown in FIG. 10 and FIG. 11, the inner tube 44 is a tubular member that is circular or substantially circular in cross-section including a closed upper end and an open lower end. The outer tube 45 is a tubular member that is circular or substantially circular in cross-section including a closed upper end and lower end. A portion of the inner tube 44 is housed in the outer tube 45, and the remaining portion (an upper end portion) of the inner tube 44 axially projects from the upper end of the outer tube 45. The interior of the inner tube 44 is axially partitioned into two portions by the piston 42. The gap between an inner peripheral surface of the inner tube 44 and the piston 42 is sealed by a seal. The piston rod 43 extends downward from the piston 42 along the center line L1 of the damper 21. The piston rod 43 and the piston 42 are axially movable with respect to the cylinder tube 41. The piston rod 43 axially moves together with the piston 42.

As shown in FIG. 10 and FIG. 11, the inner tube 44 and the piston 42 define two inner oil chambers (first inner oil chamber Cin1 and second inner oil chamber Cin2) axially partitioned by the piston 42. The first inner oil chamber Cin1 is a space in the inner tube 44 over the piston 42, and the second inner oil chamber Cin2 is a space in the inner tube 44 under the piston 42. The inner tube 44 and the outer tube 45 define a tubular outer oil chamber Cout between an outer peripheral surface of the inner tube 44 and an inner peripheral surface of the outer tube 45. The second inner oil chamber Cin2 leads to the outer oil chamber Cout. The first inner oil chamber Cin1 is connected to the oil chamber Coil of the sub-tank 24. The first inner oil chamber Cin1, the second inner oil chamber Cin2, and the outer oil chamber Cout are filled with oil (hydraulic fluid).

As shown in FIG. 10 and FIG. 11, the sub-tank 24 includes a tank 46 filled with oil and gas and a bladder 47 that partitions the interior of the tank 46 into an oil chamber Coil filled with oil and a gas chamber Cgas filled with gas. The sub-tank 24 may include a free piston in place of the bladder 47. The tank 46 is connected to the damper 21 by the piping Pi1. The oil chamber Coil of the sub-tank 24 is connected to the first inner oil chamber Cin1 via a second oil passage 49 to be described below. The oil chamber Coil is isolated from the gas chamber Cgas by the bladder 47. The bladder 47 is defined by an elastic material such as rubber or resin. When a pressure difference occurs between the oil chamber Coil and the gas chamber Cgas, the bladder 47 is displaced, and the volume of the oil chamber Coil changes.

As shown in FIG. 10 and FIG. 11, the rear suspension 12 includes a first oil passage 48 that connects the first inner oil chamber Cin1 provided in the inner tube 44 to the outer oil chamber Cout provided between the inner tube 44 and the outer tube 45 and a second oil passage 49 that connects the first inner oil chamber Cin1 to the oil chamber Coil of the sub-tank 24. The rear suspension 12 further includes a damping force adjusting valve 50 that applies resistance to the oil flowing through the first oil passage 48 and a damping force adjusting motor 51 that adjusts the opening degree of the damping force adjusting valve 50.

As shown in FIG. 10 and FIG. 11, the first oil passage 48 and the second oil passage 49 are disposed outside the inner tube 44 and the outer tube 45. The flow passage area (area of a cross-section orthogonal or substantially orthogonal to the circulation direction) of the first oil passage 48 is smaller than the flow passage area of the inner tube 44, that is, the flow passage area of each inner oil chamber (each of the first inner oil chamber Cin1 and the second inner oil chamber Cin2). Similarly, the flow passage area of the second oil passage 49 is smaller than the flow passage area of the inner tube 44. The first oil passage 48 and the second oil passage 49 are thus narrower than each inner oil chamber.

As shown in FIG. 10 and FIG. 11, the first oil passage 48 includes a first end portion 48a connected to the first inner oil chamber Cin1 and a second end portion 48b connected to the outer oil chamber Cout. The second oil passage 49 includes a first end portion 48a connected to the first inner oil chamber Cin1 and a second end portion 49b connected to the oil chamber Coil. The first oil passage 48 and the second oil passage 49 branch off at a branching position P1 in the first oil passage 48. An oil passage (sharing portion X1, the hatched portion) from the first end portion 48a of the first oil passage 48 and the second oil passage 49 to the branching position P1 is a portion of the first oil passage 48 and is also a portion of the second oil passage 49. The first oil passage 48 and the second oil passage 49 thus share a portion (sharing portion X1) with each other.

As shown in FIG. 10 and FIG. 11, the damping force adjusting valve 50 is a needle valve including a needle 52 serving as a valve body. The damping force adjusting valve 50 may be another type of valve such as a diaphragm valve. The needle 52 is disposed at a damping position P2 in the first oil passage 48. The damping force adjusting motor 51 is attached to the damper 21 via an insulator 53 (refer to FIG. 12) disposed between the damping force adjusting motor 51 and the upper mount 26. The damping force adjusting motor 51 is connected to the damping force adjusting valve 50. The damping force adjusting motor 51 is a stepping motor. The damping force adjusting motor 51 is not limited to a stepping motor, and may be another electric motor. The damping force adjusting motor 51 increases and reduces the flow passage area at the damping position P2 by moving the needle 52 in its axial direction. The resistance to be applied to the oil flowing through the first oil passage 48 thus changes, and the damping force of the damper 21 is adjusted.

As shown in FIG. 10, when the damper 21 is compressed, the piston 42 moves upward, so that the oil in the first inner oil chamber Cin1 is pushed out to the first oil passage 48 through the first end portion 48a of the first oil passage 48. A portion of the pushed-out oil flows into the outer oil chamber Cout through the second end portion 48b of the first oil passage 48. Also, the remaining pushed-out oil flows into the oil chamber Coil of the sub-tank 24 by passing through the second oil passage 49. On the other hand, as shown in FIG. 11, when the damper 21 rebounds, the piston 42 moves downward, so that the oil in the second inner oil chamber Cin2 is pushed out to the outer oil chamber Cout. The pushed-out oil flows into the first inner oil chamber Cin1 by passing through the second end portion 48b and the first end portion 48a of the first oil passage 48 in this order. Simultaneously therewith, the oil in the sub-tank 24 flows into the first inner oil chamber Cin1 by passing through the second oil passage 49.

As shown in FIG. 12 and FIG. 13, the damper 21 includes a plurality of flow passages (first flow passage 54 to fourth flow passage 57) provided inside the upper mount 26 and plugs 58 and a joint 59 attached to the upper mount 26.

As shown in FIG. 13, the first flow passage 54 is continuous from the first inner oil chamber Cin1, and the second flow passage 55 is continuous from the first flow passage 54. The third flow passage 56 is continuous from the second flow passage 55, and the fourth flow passage 57 is continuous from the third flow passage 56. The fourth flow passage 57 is also continuous from the outer oil chamber Cout. As to be described below, the second flow passage 55 is interposed between the oil chamber Coil of the sub-tank 24 and the first flow passage 54. The oil chamber Coil of the sub-tank 24 is thus connected to the first inner oil chamber Cin1 via the second flow passage 55 and a portion of the first flow passage 54.

As shown in FIG. 12 and FIG. 13, each of the first flow passage 54 to the fourth flow passage 57 is a linearly extending columnar flow passage. Each of the first flow passage 54 to the fourth flow passage 57 linearly extends from one end to the other end. Each of the first flow passage 54 to the fourth flow passage 57 extends in a direction inclined with respect to the center line L1 of the damper 21 or in a direction orthogonal or substantially orthogonal to the center line L1 of the damper 21. Each of the first flow passage 54 to the fourth flow passage 57 is a communication hole defined by machining such as drilling.

As shown in FIG. 13, the first flow passage 54 and the fourth flow passage 57 extend in a direction orthogonal or substantially orthogonal to the center line L1 of the damper 21. The first flow passage 54 and the fourth flow passage 57 are mutually parallel flow passages. The first flow passage 54 and the fourth flow passage 57 are spaced apart in the vertical direction. As shown in FIG. 12, the first flow passage 54 and the fourth flow passage 57 are also spaced apart in the horizontal direction. One end 54a of the first flow passage 54 is open at the first inner oil chamber Cin1, and the other end 54b of the first flow passage 54 is open at an outer surface of the damper 21 (upper mount 26). One end 57a of the fourth flow passage 57 is open at the outer oil chamber Cout, and the other end 57b of the fourth flow passage 57 is open at the outer surface of the damper 21. The other end 54b of the first flow passage 54 and the other end 57b of the fourth flow passage 57 are blocked by plugs 58.

As shown in FIG. 12, the second flow passage 55 is disposed under the first flow passage 54, and overlaps with the first flow passage 54 in a plan view. As shown in FIG. 13, the second flow passage 55 extends in a direction inclined with respect to the first flow passage 54 and the fourth flow passage 57. The second flow passage 55 is inclined with respect to the center line L1 of the damper 21 so that the other end 55b of the second flow passage 55 corresponding to the lower end is located farther away with respect to the center line L1 of the damper 21 than one end 55a of the second flow passage 55 corresponding to the upper end. The one end 55a of the second flow passage 55 is open at the first flow passage 54, and the other end 55b of the second flow passage 55 is open at the outer surface of the damper 21. The other end 55b of the second flow passage 55 is disposed lower than the first flow passage 54 and the fourth flow passage 57. The joint 59 is connected to the other end 55b of the second flow passage 55 by a bolt B1. The piping Pi1 (refer to FIG. 9) that connects the damper 21 and the sub-tank 24 is attached to the upper mount 26 via the joint 59.

As shown in FIG. 13, the third flow passage 56 extends in a direction (depth direction of the sheet) orthogonal or substantially orthogonal to the second flow passage 55. Further, as shown in FIG. 12, the third flow passage 56 extends in a direction orthogonal or substantially orthogonal to the first flow passage 54 and the fourth flow passage 57. The third flow passage 56 thus extends in a direction orthogonal or substantially orthogonal to the first flow passage 54, the second flow passage 55, and the fourth flow passage 57. One end 56a (refer to FIG. 13) of the third flow passage 56 is open at the second flow passage 55, and the other end 56b (refer to FIG. 12) of the third flow passage 56 is open at the outer surface of the damper 21. The other end 56b of the third flow passage 56 is disposed further to the rear than the first flow passage 54, the second flow passage 55, and the fourth flow passage 57. The damping force adjusting valve 50 is disposed in the third flow passage 56. The other end 56b of the third flow passage 56 is blocked by the damping force adjusting motor 51 and the insulator 53.

The first flow passage 54 to the fourth flow passage 57 constitute the first oil passage 48 and the second oil passage 49. In other words, the first oil passage 48 and the second oil passage 49 include the first flow passage 54 to the fourth flow passage 57.

The first oil passage 48 is a flow passage from the one end 54a of the first flow passage 54 to the other end 57b of the fourth flow passage 57 that passes through the one end 54a of the first flow passage 54, an intersection portion between the first flow passage 54 and the second flow passage 55, an intersection portion between the second flow passage 55 and the third flow passage 56, an intersection portion between the third flow passage 56 and the fourth flow passage 57, and the other end 57b of the fourth flow passage 57 in this order.

The second oil passage 49 is a flow passage from the one end 54a of the first flow passage 54 to the other end 56b of the third flow passage 56 that passes through the one end 54a of the first flow passage 54, an intersection portion between the first flow passage 54 and the second flow passage 55, an intersection portion between the second flow passage 55 and the third flow passage 56, and the other end 56b of the third flow passage 56 in this order.

The shared portion X1 shared by the first oil passage 48 and the second oil passage 49 is a flow passage from the one end 54a of the first flow passage 54 to an intersection portion between the second flow passage 55 and the third flow passage 56 that passes through the one end 54a of the first flow passage 54, an intersection portion between the first flow passage 54 and the second flow passage 55, and an intersection portion between the second flow passage 55 and the third flow passage 56 in this order.

The intersection portion between the second flow passage 55 and the third flow passage 56 is the branching position P1 where the first oil passage 48 and the second oil passage 49 are branching off, and the intersection portion between the third flow passage 56 and the fourth flow passage 57 is the damping position P2 where the damping force adjusting valve 50 applies resistance to the oil.

As described above, the second flow passage 55 is inclined with respect to the center line L1 of the damper 21 so that the other end 55b of the second flow passage 55 corresponding to the lower end is located farther away with respect to the center line L1 of the damper 21 than the one end 55a of the second flow passage 55 corresponding to the upper end. The second oil passage 49 includes the second flow passage 55. Thus, as shown in FIG. 13, a portion of the second oil passage 49 is inclined with respect to the center line L1 of the damper 21, and the second end portion 49b of the second oil passage 49 is disposed farther away with respect to the center line L1 of the damper 21 than the first end portion 48a of the second oil passage 49.

As shown in FIG. 12, the entire first oil passage 48 and the entire second oil passage 49 is disposed on the right side of the reference plane R1 and the vehicle center C1. The entire first oil passage 48 and the entire second oil passage 49 is thus disposed on the same side with respect to the reference plane R1 and the vehicle center C1. Also, the damping force adjusting valve 50 is disposed on the right side of the reference plane R1 and the vehicle center C1. Similarly, the damping force adjusting motor 51 is disposed on the right side of the reference plane R1 and the vehicle center C1. The damping force adjusting valve 50 and the damping force adjusting motor 51 are thus disposed on the same side as the first oil passage 48 and the second oil passage 49 with respect to the reference plane R1 and the vehicle center C1.

Moreover, as shown in FIG. 9, the sub-tank 24 is disposed on the right side of the reference plane R1 and the vehicle center C1. In contrast thereto, the pump unit 25 is disposed on the left side of the reference plane R1 and the vehicle center C1. Thus, the sub-tank 24 is disposed on the same side as the first oil passage 48 and the second oil passage 49 with respect to the reference plane R1 and the vehicle center C1, and the pump unit 25 is disposed on the opposite side to the first oil passage 48 and the second oil passage 49 with respect to the reference plane R1 and the vehicle center C1. Therefore, the pump unit 25 is disposed on the opposite side to the sub-tank 24, the damping force adjusting valve 50, and the damping force adjusting motor 51 with respect to the reference plane R1 and the vehicle center C1.

As shown in FIG. 9, the damping force adjusting motor 51 extends in a direction inclined with respect to the reference plane R1 in a plan view. The damping force adjusting motor 51 is disposed under the hydraulic unit HU. As shown in FIG. 8, at least a portion of the damping force adjusting motor 51 is disposed at the same height as that of the cylinder 28. The damping force adjusting motor 51 is disposed lower than the upper mounting axis A1. Further, the damping force adjusting motor 51 is disposed further to the rear than the upper mounting axis A1. As described above, the sub-tank 24, the hydraulic pump 37, and the vehicle height adjusting motor 39 are disposed further to the rear than the upper mounting axis A1. The damping force adjusting motor 51, the sub-tank 24, the hydraulic pump 37, and the vehicle height adjusting motor 39 are thus disposed further to the rear than the upper mounting axis A1.

As described above, in the present preferred embodiment, the vehicle height adjusting motor 39 that drives the hydraulic pump 37 is disposed under the seat 3. Further, the vehicle height adjusting motor 39 is disposed between the pair of seat frames 7 in a plan view. That is, the seat 3 is disposed over the vehicle height adjusting motor 39, and the seat frames 7 are disposed on the right side and left side of the vehicle height adjusting motor 39. The vehicle height adjusting motor 39 is thus be protected by the seat 3 and the seat frames 7. Further, because the vehicle height adjusting motor 39 is disposed between the pair of seat frames 7 in a plan view, an increase in the size of the motorcycle 1 in the vehicle width direction (left-right direction) is significantly reduced or prevented.

Also, in the present preferred embodiment, the damper 21 of the rear suspension 12 includes the double-tube cylinder 41 including the inner tube 44 and the outer tube 45. The first inner oil chamber Cin1 of the inner tube 44 is connected via the first oil passage 48 to the outer oil chamber Cout provided between the inner tube 44 and the outer tube 45, and connected to the oil chamber Coil provided inside the sub-tank 24 via the second oil passage 49. The first oil passage 48 and the second oil passage 49 share a portion with each other. The number of components and processing man-hours is thus reduced more than when the first oil passage 48 and the second oil passage 49 are mutually independent oil passages. Moreover, because the entire first oil passage 48 and the entire second oil passage 49 is disposed on the same side with respect to the reference plane R1, the width of the rear suspension 12 is reduced. The rear suspension 12 is thus reduced in size.

Further, in the present preferred embodiment, the vehicle height adjusting motor 39 included in the electrically-operated vehicle height adjusting mechanism is disposed at a portion further upstream than the spring 22 called an over-spring portion. Similarly, the damping force adjusting motor 51 included in the electrically-operated damping force adjusting mechanism is disposed at a portion further upstream than the spring 22. The over-spring portion has less vibration than that of a portion further downstream than the spring called an under-spring portion (portion closer to the road surface). The vehicle height adjusting motor 39 and the damping force adjusting motor 51 thus reduces vibrations. The vehicle height adjusting motor 39 and the damping force adjusting motor 51 thus have an enhanced durability.

Although preferred embodiments of the present invention have been described above, the present invention is not limited to the contents of the preferred embodiments, and can be variously modified within the scope of the appended claims.

For example, in the aforementioned preferred embodiments, the number of dampers 21 included in the rear suspension 12 preferably is one. However, the rear suspension 12 may include a pair of left and right dampers 21 that are respectively disposed on the right side and left side of the vehicle center C1. In this case, the number of sub-tanks 24 and the pump units 25 may further be included according to the number of dampers 21.

Also, in the aforementioned preferred embodiments, the sub-tank 24 preferably is attached to the damper 21 by the piping Pi1. However, the sub-tank 24 may be directly connected to the upper mount 26 of the damper 21. Specifically, at least a portion of the sub-tank 24 may be integrated with the upper mount 26.

Also, in the aforementioned preferred embodiments, the hydraulic pump 37 preferably extends in a direction inclined with respect to the front-rear direction in a plan view. However, the hydraulic pump 37 may extend along the front-rear direction in a plan view.

Also, in the aforementioned preferred embodiments, a portion of the pump unit 25 preferably overlaps the swing region of the rear wheel Wr in a side view. However, the pump unit 25 may not overlap the swing region of the rear wheel Wr in a side view.

Also, in the aforementioned preferred embodiments, the pump unit 25 as a whole preferably is disposed between the right end edge 2R and the left end edge 2L of the vehicle body frame 2 in a plan view. However, a portion of the pump unit 25 may be disposed further to the side than the right end edge 2R and the left end edge 2L of the vehicle body frame 2 in a plan view.

Also, in the aforementioned preferred embodiments, a portion of the pump unit 25 preferably overlaps the pair of seat frames 7 in a side view. However, the pump unit 25 may not overlap the pair of seat frames 7 in a side view.

Also, in the aforementioned preferred embodiments, a portion of the pump unit 25 preferably is disposed laterally of the rear wheel Wr in a plan view. However, the pump unit 25 may not be disposed laterally of the rear wheel Wr in a plan view.

Also, in the aforementioned preferred embodiments, the pump unit 25 preferably extends from a position under the cross member 8 to a position over the cross member 8 through the through-hole 8a that penetrates the cross member 8 in the up-down direction. However, the pump unit 25 may not penetrate the cross member 8 in the up-down direction.

Also, in the aforementioned preferred embodiments, the vehicle height adjusting motor 39 as a whole preferably is disposed over the gear mechanism 38 to transmit a rotation of the vehicle height adjusting motor 39 to the hydraulic pump 37. However, a portion of the vehicle height adjusting motor 39 may be disposed at the same height as that of the gear mechanism 38 or lower than the gear mechanism 38. Alternatively, the gear mechanism 38 may be omitted, and the hydraulic pump 37 may be directly driven by the vehicle height adjusting motor 39.

Also, the positional relationship of the cylinder 28, the sub-tank 24, and the pump unit 25 with respect to the reference plane R1 and the vehicle center C1 is not limited to the positional relationship in the aforementioned preferred embodiments, and may be appropriately changed. The same applies to the positional relationship of the first oil passage 48, the second oil passage 49, the damping force adjusting valve 50, and the damping force adjusting motor 51 with respect to the reference plane R1 and the vehicle center C1.

Also, in the aforementioned preferred embodiments, the damping force adjusting motor 51 preferably extends in a direction inclined with respect to the reference plane R1 in a plan view. However, the damping force adjusting motor 51 may extend along a straight line parallel or substantially parallel to the reference plane R1 in a plan view. That is, the damping force adjusting motor 51 may extend along the front-rear direction in a plan view.

Also, in the aforementioned preferred embodiments, the second end portion 49b of the second oil passage 49 closer to the sub-tank 24 preferably is disposed farther away with respect to the center line L1 of the cylinder 28 than the first end portion 48a of the second oil passage 49 closer to the cylinder 28. However, the distance (minimum distance) from the center line L1 of the cylinder 28 to the second end portion 49b may be set equal or substantially equal to or shorter than the distance from the center line L1 of the cylinder 28 to the first end portion 48a.

Also, in the aforementioned preferred embodiments, the first oil passage 48 and the second oil passage 49 preferably have broken line-shaped configurations. However, the shapes of the first oil passage 48 and the second oil passage 49 are not limited thereto. For example, the first oil passage 48 may have a straight or curved shape. Similarly, the second oil passage 49 may have a straight or curved shape. Of course, the first oil passage 48 may include one or more straight flow passages and one or more curved flow passages. The same applies to the second oil passage 49.

Also, in the aforementioned preferred embodiments, the damping force adjusting valve 50 to adjust the damping force of the damper 21 is disposed outside the cylinder 28. However, the rear suspension 12 may further include a damping force adjusting valve disposed inside the cylinder 28, besides the damping force adjusting valve 50. Specifically, there may be provided in the piston 42 a through-hole to connect the first inner oil chamber Cin1 and the second inner oil chamber Cin2, and a check valve that allows oil to pass only in one direction with respect to the through-hole may be attached to the piston 42.

The present application corresponds to Japanese Patent Application No. 2012-218336 filed on Sep. 28, 2012 in the Japan Patent Office, the entire disclosure of which is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motorcycle comprising:
    a vehicle body frame including a pair of seat frames spaced apart and opposing each other in a left-right direction of the motorcycle;
    a seat supported on the pair of seat frames;
    a rear wheel disposed under the pair of seat frames in a side view of the motorcycle, the rear wheel being swingable in an up-down direction of the motorcycle with respect to the vehicle body frame;
    a damper including a hydraulic jack to adjust a vehicle height of the motorcycle, the damper being arranged to absorb shocks between the vehicle body frame and the rear wheel; and
    a pump unit including a hydraulic pump to feed oil to the hydraulic jack and a vehicle height adjusting motor to drive the hydraulic pump, the vehicle height adjusting motor being located under the seat, the vehicle height adjusting motor being disposed between the pair of seat frames in a plan view of the motorcycle.

2. The motorcycle according to claim 1, wherein the hydraulic pump extends in a direction inclined with respect to a front-rear direction of the motorcycle in the plan view.

3. The motorcycle according to claim 1, wherein at least a portion of the pump unit overlaps a swing region of the rear wheel in the side view.

4. The motorcycle according to claim 1, wherein the pump unit is entirely disposed between a right end edge and a left end edge of the vehicle body frame in the plan view.

5. The motorcycle according to claim 1, wherein at least a portion of the pump unit overlaps the pair of seat frames in the side view.

6. The motorcycle according to claim 1, wherein at least a portion of the pump unit is disposed laterally of the rear wheel in the plan view.

7. The motorcycle according to claim 1, wherein the pump unit further includes a protective cover to cover the vehicle height adjusting motor.

8. The motorcycle according to claim 1, wherein the vehicle body frame further includes a cross member extending in the left-right direction from one of the pair of seat frames to the other of the pair of seat frames; and
    the pump unit extends from a position under the cross member to a position over the cross member through a through-hole that penetrates the cross member in the up-down direction.

9. The motorcycle according to claim 1, wherein the pump unit further includes a gear mechanism disposed lower than the vehicle height adjusting motor, the gear mechanism being arranged to transmit a rotation of the vehicle height adjusting motor to the hydraulic pump.

10. The motorcycle according to claim 1, wherein the damper includes a cylinder filled with oil;
    the motorcycle further includes a sub-tank an interior of which is partitioned into an oil chamber connected to an interior of the cylinder and a gas chamber filled with gas; and
    the sub-tank is disposed on an opposite side to the pump unit with respect to the cylinder in the left-right direction.

11. The motorcycle according to claim 1, wherein the damper includes a cylinder filled with oil;
    the motorcycle further includes:
        a hydraulic brake to apply a braking force to the motorcycle; and
        an Anti-Lock Braking System including a hydraulic unit connected to the hydraulic brake, the Anti-Lock Braking System arranged to control a hydraulic pressure to be applied to the hydraulic brake by the hydraulic unit; and
    at least a portion of the hydraulic unit is disposed on an opposite side to the pump unit with respect to the cylinder in the left-right direction.

12. The motorcycle according to claim 1, wherein the damper includes a cylinder filled with oil;
    the motorcycle further includes:
        a sub-tank an interior of which is partitioned into an oil chamber connected to an interior of the cylinder and a gas chamber filled with gas;
        a hydraulic brake to apply a braking force to the motorcycle; and
        an Anti-Lock Braking System including a hydraulic unit connected to the hydraulic brake, the Anti-Lock Braking System arranged to control a hydraulic pressure to be applied to the hydraulic brake by the hydraulic unit;
    the sub-tank is disposed on an opposite side to the pump unit with respect to a vehicle center in the left-right direction; and
    at least a portion of the hydraulic unit is disposed on an opposite side to the pump unit with respect to the vehicle center.

* * * * *